(12) United States Patent
Ben-Shaul et al.

(10) Patent No.: US 9,753,669 B2
(45) Date of Patent: Sep. 5, 2017

(54) REAL TIME CLOUD BURSTING

(71) Applicant: Velostrata Ltd., Netanya (IL)

(72) Inventors: Israel Ben-Shaul, Ramat Hasharon (IL); Ady Degany, Haifa (IL); Leonid Vasetsky, Zikhron Yaakov (IL); Shahar Glixman, Kiryat Tivon (IL); Yaniv Ben-Ari, Kochav Yair (IL)

(73) Assignee: Velostrata Ltd., Netanya (IL)

( * ) Notice: Subject to any disclaimer, the term of this patent is extended or adjusted under 35 U.S.C. 154(b) by 296 days.

(21) Appl. No.: 14/554,837

(22) Filed: Nov. 26, 2014

(65) Prior Publication Data

US 2015/0331635 A1 Nov. 19, 2015

Related U.S. Application Data

(60) Provisional application No. 61/992,560, filed on May 13, 2014.

(51) Int. Cl.
*G06F 3/06* (2006.01)
*G06F 12/08* (2016.01)
*G06F 9/50* (2006.01)
*G06F 9/48* (2006.01)
*G06F 12/0868* (2016.01)
*H04L 29/08* (2006.01)

(52) U.S. Cl.
CPC ............ *G06F 3/0647* (2013.01); *G06F 3/061* (2013.01); *G06F 3/064* (2013.01); *G06F 3/0635* (2013.01); *G06F 3/0683* (2013.01); *G06F 9/4856* (2013.01); *G06F 9/5061* (2013.01); *G06F 9/5072* (2013.01); *H04L 67/1097* (2013.01); *H04L 67/2847* (2013.01); *H04L 67/2852* (2013.01); *H04L 67/2876* (2013.01); *G06F 12/0868* (2013.01); *H04L 67/1095* (2013.01)

(58) Field of Classification Search
CPC ........... G06F 17/30017; G06F 12/0851; G06F 12/0868; G06F 3/0635; G06F 3/064; H04L 67/125
USPC ......................................... 713/1, 2, 100, 300
See application file for complete search history.

(56) References Cited

U.S. PATENT DOCUMENTS

2013/0036213 A1* 2/2013 Hasan ................. H04L 67/1097
709/223

FOREIGN PATENT DOCUMENTS

EP 2 945 065 A2 5/2015

OTHER PUBLICATIONS

Zhang, et al., "Intelligent Workload Factoring for a Hybrid Cloud Computing Model", IEEE, dated 2009, 8 pages.
Seo et al., "HPRMR: Prefectching and Pre-Shuffling in Shared MapReduce Computation Environment", dated Aug. 31, 2009, IEEE, 8 pages.

(Continued)

*Primary Examiner* — Michael J Brown
(74) *Attorney, Agent, or Firm* — Hickman Palermo Becker Bingham LLP

(57) ABSTRACT

A method and system for real-time cloud bursting is provided. The method and system are directed to extending a data center with cloud computing resources by decoupling computing resources and storage devices in a virtualized data center, and booting the decoupled computing resources in a staged process while storage devices are divided and prioritized into components. Data and boot instructions are re-routed and cached as needed through a proxy system.

17 Claims, 24 Drawing Sheets

(56) References Cited

OTHER PUBLICATIONS

Reich et al., "WMTorrent: Scalable P2P Virtual Machine Streaming", CoNext, dated Jan. 1, 2012, ACM, 12 pages.
Reich et al., "VMTorrent: Scalable P2P Virual Machine Streaming", dated Dec. 10, 2012, 64 pages.
Harris, Derrick, "Gigaom Amazon Fuses Your Storage System with its Cloud", dated Jan. 25, 2012, 6 pages.gigaom.com/2012/01/25/aws-fuses-your-storage-system-with-its cloud/.
Guo et al., "Cost-Aware Cloud Bursting for Enterprise Applications", ACM Transactions on Internet Technology, dated May 1, 2014, 24 pages.
European Patent Office, "Search Report" in application No. 15167252.4-1957, dated May 24, 2016, 11 pages.
European Claims in application No. 15167252.4-1957, dated May 2016, 4 pages.

* cited by examiner

REAL TIME CLOUD BURSTING

BENEFIT CLAIM

This application claims the benefit under 35 U.S.C.§119 (e) of provisional application 61/992,560, filed May 13, 2014, the entire contents of which is hereby incorporated by reference for all purposes as if fully set forth herein.

FIELD OF THE DISCLOSURE

The present disclosure generally relates to data processing in the field of networked data centers or cloud computing. The disclosure relates more specifically to improved computer-implemented techniques for effectively extending a data center with cloud resources.

BACKGROUND

The use of large data centers to provide a computing infrastructure has become widespread. These data centers may experience "peak load" periods where the demand on the infrastructure drastically increases for short periods of time.

The average data center infrastructure is designed to handle an average computational load, but it is under provisioned for peak loads. When a peak occurs, workloads take more time to complete. Mildly over provisioning the infrastructure of a data center above its average computational load does not solve the problem of noticeably slower application performance during peak loads. For example, if a data center with a 10% over provision for average computational load has a peak load that requires 50% additional capacity, a task that should finish in two weeks would take ten weeks to complete. In many cases, such delays cannot be tolerated by a business because tasks occurring during peak loads are typically time sensitive (e.g., end of quarter calculations, holiday on-line shopping, or a tape-out activity associated with releasing a new chip). As a result, other mainline activities are pushed out or delayed, leading to overall business disruption.

Additional computing resources are also typically needed to account for hardware failure and unforeseen new workloads. To minimize a service disruption after server failure, a data center may use an additional standby server to take over the workloads of the faulty server and continue to serve client requests. Similar high availability systems are needed when an administrator of a data center has unforeseen new workloads, even if they are not characterized as peak loads. Examples of unforeseen new workloads include new projects and testing new tools for which extra computing capacity is needed.

The main approach to handling these difficulties is to over provision a data center's infrastructure by maintaining substantially more hardware than is needed. This over provisioning of the infrastructure of the data center causes performance to never noticeably be affected by peak loads because the hardware is rarely fully utilized. For example, if a data center with a 50% over provision for an average computational load has a peak load that requires the additional capacity, but only for 20% of the time, then 40% of the infrastructure is wasted on average, since 80% of the time, 50% of capacity is not utilized. Over provisioning in this manner decreases profit margins significantly by increasing base costs of the infrastructure, and recurring costs of power, cooling, maintenance, hardware refresh, software licenses and human resources.

The prior examples also assume peak loads and average computational load are semi-predictable when in fact they are not. Peak loads can be longer in time, higher in computing needs, and at time completely unexpected. For instance, a "trading storm" due to an unforeseen event that creates turmoil in the stock market leads to unpredictable peak load. The difference between average loads and peak loads can become convoluted as a data center experiences new projects, changes in business, growth or decline in headcount, and additional capacity requirements of existing projects. The inability to forecast computational needs of a data center regularly leads to higher costs, slower performance, excessive downtime, or even underutilization of available resources.

The approaches described in this section are approaches that could be pursued, but are not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
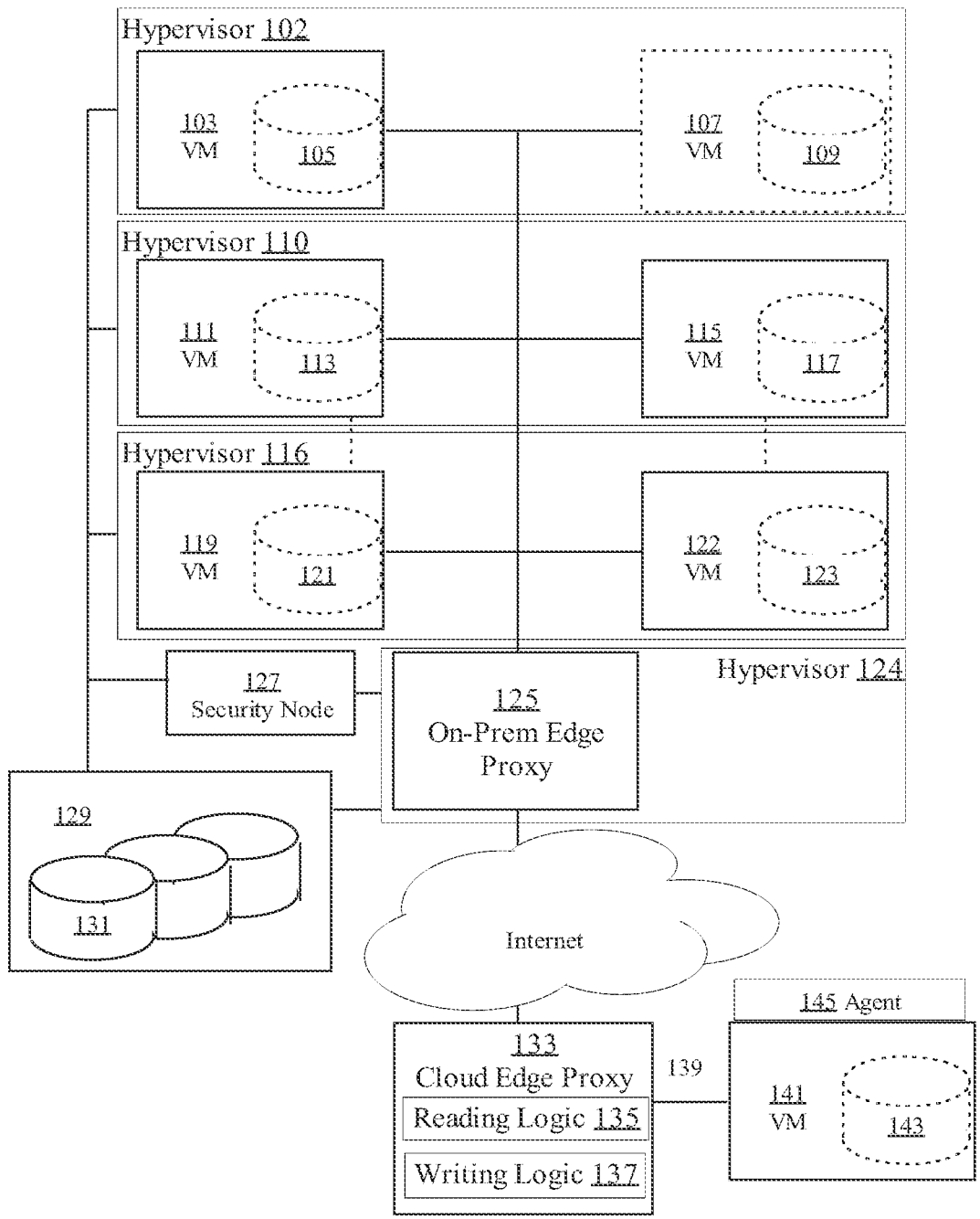
FIG. 1 is a block diagram illustrating a system architecture of a hybridized data center after transferring a computing instance.

In some embodiments, a method and system for extending a data center with cloud computing resources by real time cloud bursting is described herein. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 System Architecture
3.0 Cloud-On-Demand Functionality
4.0 Hybridized Functionality
5.0 Determining What Workloads to Cloud Burst
6.0 Determining a Preferable Cloud Host for Cloud Bursting
7.0 Hardware Overview 1.0 General Overview The needs identified in the foregoing Background, and other needs and objects that will become apparent from the following description, are achieved in the present invention, which comprises, in one aspect, a method for extending a data center with cloud computing resources by decoupling computing resources and storage devices in an instance, and having the decoupled instance, hereinafter a computing instance, disklessly boot on the cloud while storage devices are divided and prioritized into components with data paths being re-routed as needed through a proxy system.

The system architecture of an embodiment of the real time cloud bursting has two edge proxies connecting a remote "cloud" network to a local network that is typically on the premises of a particular entity and termed an "on-prem" network. The proxies are responsible for manipulating and transferring instances as well as re-routing calls to storage using a network protocol. In some embodiments, a computer program-supported framework is created whereby the cloud edge proxy serves as a block storage device for an instance running in the cloud. The framework comprises creating one or more staging images for one or more cloud hosts to provide a staged boot sequence of any computing instance. The framework also includes setting up data paths based on the write persistence of a computing instance.

The implementations of the cloud bursting mechanisms herein described occur within a spectrum from shutting down and rebooting an instance with proxied storage, to transparently transferring an instance while it is running. As the real time cloud bursting mechanism approaches run-time transfer, more configuration data is needed for instances to be live transferred.

Functionality of the cloud bursting system herein described includes, but is not limited to, providing instance transfer functionality, cloning functionality, reverse storage transfer functionality, scaled migration functionality, and edge proxy resizing. In preferred embodiments, instance transfer and cloning involve having an instance decoupled from its storage. In preferred embodiments, reverse instance transfer and migration involve having an instance re-coupled with its storage.

2.0 System Architecture

In order to provide a thorough understanding of the present invention, embodiments of specific system components are described herein. These embodiments describe a computer system architecture according to a preferred embodiment and are delineated for instructive purposes only. One or more components may not be necessary to implement different functionalities of the invention. Additional components may be added or removed for network management or network performance as understood in the art.

As seen in FIG. 1, the system architecture of a hybridized network 101 comprises computing instances 103, 111, 115, 119, 122, and 141, a cloud edge proxy 133, and on-prem edge proxy 125, and one or more storage devices 105, 109, 113, 117, 121, 123, 143 (depicted as 131) in a network storage node 129. In this embodiment, the computing instance 141 is a virtual machine moved from position 107 and monitored with a monitoring agent 145. The computing instance 141 is modified to enable storage requests route to and from a cloud edge proxy 133 by mounting the edge proxy 133 as the primary storage for computing instance 141 using an iSCSI protocol through a network connection 139. The cloud edge proxy 133 re-routes data to and from an on-prem edge proxy 125 AND to and from a computing instance 141 with reading logic 135 and writing logic 137. The on-prem edge proxy 125 re-routes data to and from on-prem storage disks 131 as needed AND to and from the cloud edge proxy 133.

In some embodiments, the local computing instances 103, 111, 115, 119, 122 have access to their respective local storage resources 105, 113, 117, 121, 123 in network storage node 129 through their underlying hypervisors 102, 110, 116.

There are various methods by which storage may be accessed. In some embodiments, access to a local storage resource 131 in storage node 129 through the on-prem edge proxy 125 is done through the hypervisor 124 as the storage provider. In this case the local storage resource 109 of the remote instance 141 is formatted for a structured data storage scheme (e.g., vmdk) and placed in a network storage node 129, or the storage node 129 is mapped through the hypervisor 124 as a raw-device and then accessed by on-prem edge proxy 125. In other embodiments, methods are used to directly access local storage resource 109 located in storage node 129, without going through the hypervisor 124, including but not limited to—VDDK (Virtual Disk Development Kit) or direct access to SAN via iSCSI or Fibre Channel, or direct virtual disk file access over networked file system such as NFS or other file server protocols.

In another embodiment, the hybridized data center consists of virtual machines accessing directly attached physical disks. In such an embodiment, the physical disks do not need to be in a centralized repository such as node 129. Instead the physical disks may be accessible directly by the virtual machines.

In yet another embodiment, the hybridized data center consists of physical machines accessing physical disks. FIG.

20 is a block diagram illustrating a system architecture of an alternative hybridized data center. The system 2001 comprises multiple computers 2003, 2007, 2011, 2015, 2019, and 2022 with a network storage node 2029 containing local storage resources 2005, 2009, 2013, 2017, 2021, and 2023 associated with each respective computer. The system 2001 may also comprise additional network devices such as a security management node 2027. The multiple computers 2003, 2007, 2011, 2015, 2019, and 2022 are networked together and controlled by the on-prem edge proxy 2025 when they need to execute in the cloud.

The system architecture 2001 of an embodiment of the edge proxy system comprises a computing instance 2041, a cloud edge proxy 2033, and on-prem edge proxy 2025, and one or more local storage devices 2029. In this embodiment, the computing instance 2041 is a virtual machine and has a monitoring agent 2045. The computing instance 2041 is modified such that storage requests route to and from a cloud edge proxy 2033 using an iSCSI protocol as needed through a network connection 2039. In one embodiment, the cloud edge proxy 2033 comprises a monitoring service, an orchestrator, a storage target, a data stream, and a secure cache. The cloud edge proxy 2033 re-routes data to and from an on-prem edge proxy 2025 AND to and from a computing instance 2041, as needed.

2.2 Instance

Data centers more efficiently use their physical machines by running multiple instances of virtual machines or application containers on each physical machine. In this manner, more workloads can be utilized on less hardware. An instance is a virtualization of a computer system. An instance comprises computing resources and some form of storage.

A virtual machine instance is an independent software implementation of a machine. Different operating systems can run on each virtual machine without affecting the other virtual machines running on the same host physical machine.

An application container instance involves running a kernel with several different partial operating systems on top of that kernel. The same partial operating system needs to be run in each instance, but as a tradeoff there are performance benefits to running a container based virtualization. Hereinafter, "instances" refers to both virtual machine instances and container based instances.

Figure 2:
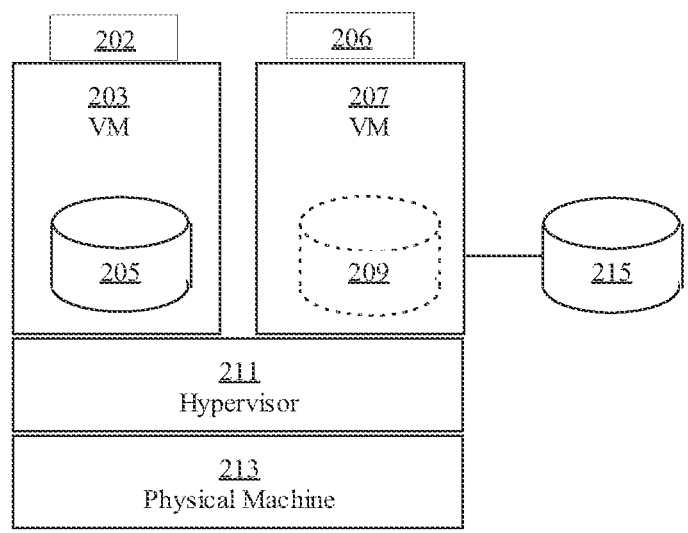
FIG. 2 is a block diagram of a two to one instance architecture on a host machine delineating the difference between an instance and a computing instance.

A two to one instance architecture is shown in FIG. 2. The physical host machine 213 has a hypervisor 211 loaded onto it. The hypervisor 211 acts as a virtualization environment for multiple instances 203, 207. Type 1 Hypervisors run directly on the host hardware, and type 2 hypervisors run within a conventional operating system environment called the host OS (not shown). Examples of type 1 hypervisors include, but are not limited to, Oracle VM Server for SPARC, Oracle VM Server for x86, the Citrix XenServer, VMware ESX/ESXi and Microsoft Hyper-V 2008/2012. Examples of type 2 hypervisors include, but are not limited to, VMware Workstation and VirtualBox. Within a hypervisor 211 an administrator can create multiple instances of a machine. In FIG. 2, two instances 203, 207 were created on a single physical host machine 213. Hereinafter, "underlying virtualization environment" refers to hypervisors (type 1 and type 2), applications, and host OS's used to start and run instances.

Embodiments may rely on networking individual instances and manipulating these instances by modifying the instance 203, by controlling the instance through an underlying virtualization environment 211, or by mounting a monitor or control agent 202 on the instance.

2.3 Computing Instance

Cloud computing resources are more efficiently leveraged by a data center if as little storage as possible is kept on the cloud host. If at least some storage does not need to be transferred to a cloud host, workloads can be transferred to a cloud host quicker and for relatively less cost. An embodiment of a computing instance can be seen in FIG. 2 as computing instance 207, which is a virtualization of a computer system with its storage 215 decoupled from the instance 207.

Some embodiments may rely on transforming an instance 203 into a computing instance 207, and then controlling the computing instance by updating the computing instance 207, by controlling the instance through its underlying virtualization environment 211, or by mounting a monitor or control agent 206 on the computing instance 207.

2.4 On-Prem Edge Proxy

An on-prem edge proxy is a virtual appliance that resides on premises (on-prem). The on-prem edge proxy controls network traffic to and from a cloud edge proxy. The on-prem edge proxy preferably comprises a management service, an on-prem orchestrator, a streaming data path, and a disk management service.

A management service comprises management and monitoring software that connects to one or more instances, their underlying virtualization environments, their mounted agents, or any combination thereof, to monitor and control storage usage, computational loads, hardware statuses of host machines, network usage, and other computing metrics.

In a preferred embodiment, the on-prem edge proxy handles security management, network storage, and the transfer of networked instances. In other embodiments, the on-prem edge proxy handles additional network services, such as a DNS node or a DNS proxy node, and other network devices. However, only a few network devices are explained here for context.

FIG. 1 is a schematic diagram of a hybridized network 101 comprising multiple instances 103, 107, 111, 115, 119, and 122 on one or more hypervisors 102, 110, 116, 124 with a network storage node 129 and a security management node 127. The multiple instances 103, 107, 111, 115, 119, and 122 are networked together and controlled by the on-prem edge proxy 125 in cases where they need to run in cloud. The nodes are added to a directory service with the security management node 127 and additional storage is available to the network via network storage node 129 such as a network attached storage (NAS) or SAN. Access to network storage node 129 is typically mediated through a hypervisor 102, 110, 116, 124. The hypervisor provides the virtual disk abstraction to guest VMs.

A security management node 127 usually comprises software to authenticate and authorize other nodes on a network. For example, Microsoft Active Directory (AD) is a directory service that authenticates and authorizes users and computers in a Windows domain network. While a preferred embodiment uses AD, other embodiments may use Mac OS X Server Open Directory or other Lightweight Directory Access Protocol (LDAP) directories.

A network storage node 129 comprises file and block level data storage that connects to the network. In a preferred embodiment, an NAS node has a slimmed-down operating system, specialized hardware, and a file system that processes I/O requests by supporting the popular network block access protocols such as iSCSI and file server protocols, such as CIFS for Windows and NFS for Unix.

Figure 3:
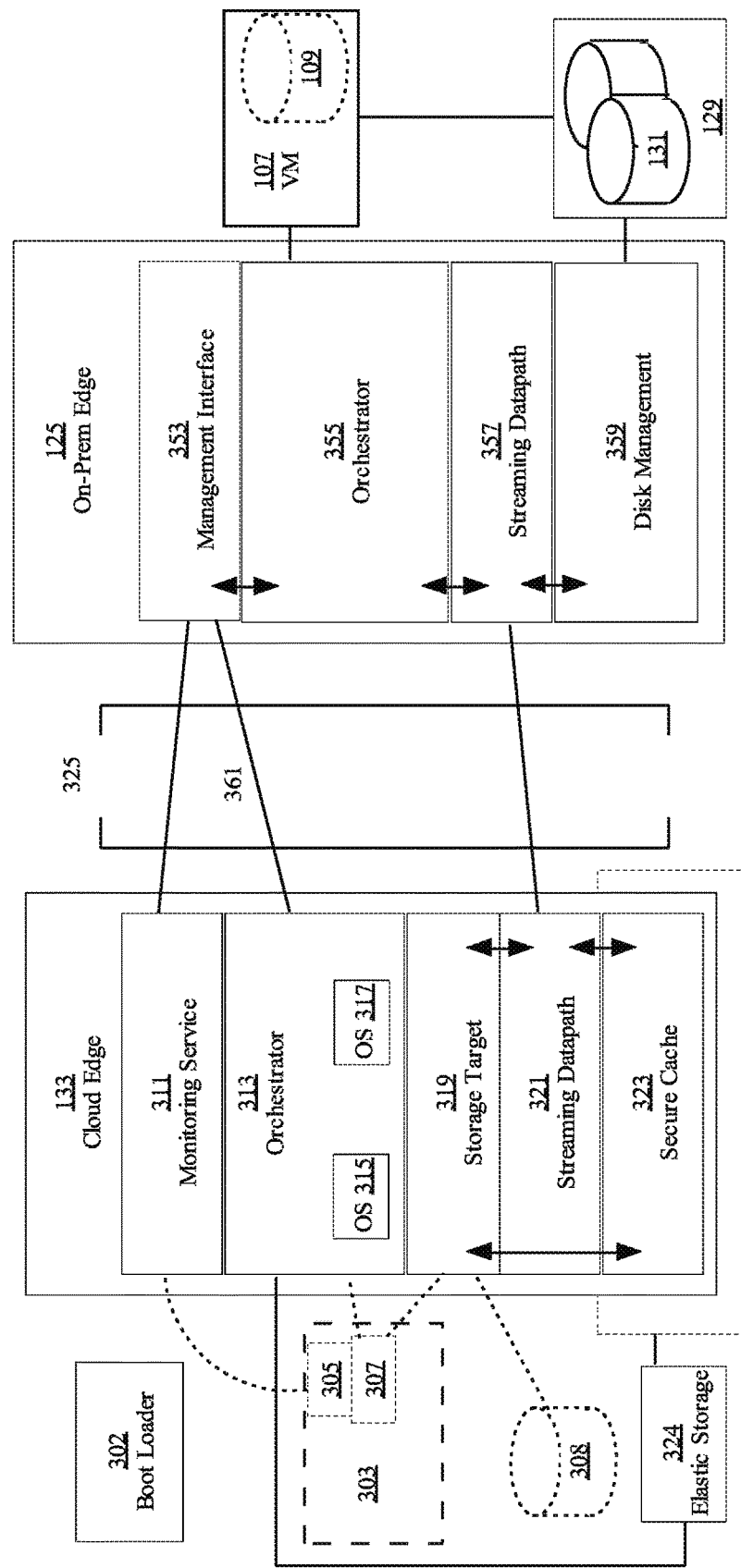
FIG. 3 is a system blueprint illustrating an example edge proxy system.

As seen in FIG. 3, in one embodiment, the on-prem edge proxy 125 comprises a management interface component 353, an orchestrator component 355, a streaming data path component 357, and a disk management component 359. The management interface 353 is a component of the on-prem edge proxy 125 used to control the various nodes and components in FIG. 1. The management interface 353 implements various workflows on nodes on the on-prem side through the on-prem orchestrator 355 and various nodes on the cloud side through the cloud orchestrator 313. The management interface 353 also receives information from one or more monitoring services 311 and on-prem host virtualization environments (not shown).

The on-prem orchestrator 355 is preferably a component to start and modify local devices through workflows and programs that implement processes as further described herein. For example, the virtual machine 107 coupled to the on-prem edge proxy 125 can be started, added to a directory service, decoupled from its virtual disk(s) 365, and then transferred to the cloud edge proxy 133 in one workflow. Additionally, the orchestrator stores configuration information from one or more cloud edge proxies 133, 673 (shown in FIG. 6). This information is used to adapt instances such as 107 taken from on-prem to be transferred to the cloud. Various workflows, hereinafter described, may be implemented partially by the on-prem orchestrator 355 and partially by the cloud orchestrator 313, but started from the management interface 353.

For example, the on-prem edge proxy 125 may use workflows using vSphere Orchestrator 355 to create and modify virtual machines in the local data center. With the addition of a vCenter Plugin, the management interface 353 can leverage vSphere Orchestrator 355 workflows to monitor and control all of the VMs running in a data center. In addition, the orchestrator 355 can be used to automatically monitor and control other resources such as an Active Directory (AD) and any Network Attached Storage (NAS).

The streaming data path 357 is preferably a component for streaming data between the cloud-edge proxy and the on-prem edge proxy. The on-prem streaming data path 357 transfers instances 107 according to workflows defined by the on-prem orchestrator 355 and transfers data from disk management 359 as requested.

The disk management service 359 is a component preferably designed to retrieve data from virtual disks 131 or virtual boot disks 131 mounted to the on-prem edge proxy or stored in network storage (not shown) or accessing the network storage directly. The disk management service 359 reroutes I/Os to the necessary virtual disks after locking them in a mutually exclusive manner to prevent other virtual machines access to the disks, and after an instance has been decoupled from its virtual storage device(s).

2.5 Cloud Edge Proxy

The cloud edge proxy is a virtual appliance that resides on the cloud. The cloud edge proxy controls network traffic to and from the on-prem edge proxy.

Initially, setting up the cloud edge proxy requires starting an instance in the cloud and mounting cloud storage to the instance. For example, using AWS EC2 one can create an instance defined as the cloud edge proxy. Then, using AWS EBS (Elastic Block Store) one can create block storage and mount it to the cloud edge proxy. In a preferred embodiment as seen in FIG. 3, once the underlying infrastructure is created, five components are created on the cloud edge proxy 133: a monitoring service 311, a cloud orchestrator 313, a storage target 319, a streaming data path 321, and a secure cache 323.

The monitoring service 311 is preferably a requesting and forwarding mechanism of the monitoring services available through a cloud service provider API and the monitoring information available through the monitoring agent 305 on a running or booting computing instance 303. The monitoring service 311 is responsible for retrieving any relevant monitoring information from instances and mapping the information to the management interface 353 of the on-prem edge proxy 125. Any translation of information can be done by either the on-prem edge proxy 125 or the cloud edge proxy 133, but preferably occurs on the cloud edge proxy 133.

For example Amazon's EC2 web service, has an API that can be leveraged by the monitoring service 311 to feed information to the on-prem edge proxy management interface 353, which triggers workflows created and implemented by the on-prem orchestrator 355 using a VMware vCenter Plug-In API.

The cloud orchestrator 313 is preferably the component to instantiate a partial OS 307 in the cloud by implementing pre-imaged staging images 315 or 317. Additionally, the cloud orchestrator 313 stores configuration information of the cloud host. This information is then used to adapt instances 107 taken from on-prem and transferred to the cloud. Other workflows can be implemented by the cloud orchestrator 313, but initiated by the management interface 353.

In one embodiment, the hybridized network 101 is adapted to send an instance 107 to a cloud edge proxy 133. The cloud edge proxy 133 starts a computing instance 141 on the cloud with a pre-imaged staging image 315 configured for an OS compatible with the on-prem instance 107. Additional pre-imaged staging images 317 may exist for different OS's or different computing instance configurations.

The storage target 319 is a component preferably designed to appear as a virtual data disk(s) or a virtual boot disk to an instance using iSCSI or other network protocol. The storage target 319 retrieves I/Os from the secure cache 323 or the streaming data path 321 as necessary. Additionally, the storage target 319 may reroute I/Os to a virtual disk 308.

The cloud edge proxy 133 additionally has a secure cache component 323 that offers low-latency performance for computing instances 303 that run in the cloud. This secure cache 323 is preferably kept to a small block size using elastic storage 324 provided by the cloud provider. In some embodiments, the elastic storage 324 is automatically replicated to protect from component failure. Examples of elastic storage include, but are not limited to, Amazon Elastic Block Storage (EBS) or S3 for use with Amazon EC2 instances in the AWS cloud and Codero Elastic SSD cloud Block Storage for Codero Cloud Servers.

The cloud edge proxy 133 also encrypts all data at rest, with a key provided from on-premises.

2.6 Transport Layer

Once the cloud edge proxy and the on-premises edge proxy are set up, it is necessary to set up a transport layer between the two proxies. As seen in FIG. 3, the transport layer 325 operates in between the two proxies, but additionally may provide network connections for network devices that do not use the proxy system. The transport layer is preferably WAN optimized. This optimization includes compression, de-duplication (block and file level), latency optimization, on-prem caching, forward error correction, protocol spoofing, traffic shaping, equalizing, connection limits, simple rate limits, TCP optimizations and other optimization solutions known in the art, so as to minimize the traffic over the WAN and reduce response time in completing the transfer. Another optimization that the transport layer performs is read-ahead, a predictive method that increases the size of the blocks being read by the OS for areas where sequential access is anticipated, so as to provide higher throughput, in anticipation that the pre-fetched blocks would be needed by the OS at boot time or for storage access. Such read-ahead activity greatly enhances performance especially on WAN, since it reduces the number of round trips that the OS needs to wait for while waiting for smaller blocks to be fetched. Another latency-killer is the write-behind mechanism, which essentially performs local write operations with no latency penalty, and propagates the changes in the background. The transport layer also preferably is a secure layer transport by forming a virtual private network (VPN) on-demand.

The transport layer sends data through the streaming data path 321, 357 of the proxy system, but additionally provides direct connections between the management interface 353 and other components of the cloud edge proxy 133 such as the monitoring service 311 and the cloud orchestrator 313. The streaming involves indexing and fetching a predicted minimal subset of the boot image that is needed to start the process and provide adequate response time—once control is passed to it, the image fetches the rest of itself.

2.7 Staging Image

As seen in FIG. 3, the staging image(s) 315 and 317 preferably comprise a diskless boot sequence of a small file size that initiates the boot sequence for a computing instance 303. This boot sequence may create a partial OS 307, a monitoring agent 305, and a network connection to the storage target 319.

Creation of the staging image(s) 315 and 317 involves creating a generic or template image that contains the initial stage of the boot loading sequence, such as a special-purpose boot loader and placing it in the cloud provider in a location known and accessible to the management sub-system of the cloud-bursting system. Such a location can be private to an organization, or publically shared across multiple organization accounts through an access control mechanism implemented by the cloud provider. In other embodiments, such a generic image is stored in a packed file format on the cloud edge proxy 133 itself and copied and instantiated with specific instance configuration into a bootable Elastic Storage 324 volume that is attached to the computing instance 303 to initiate the boot sequence. Upon initiation of a "run-in-cloud" operation, the native API of the cloud provider are used to instantiate the generic image, passing to it configuration information about the actual instance that needs to be transferred from on-prem to the cloud.

The staging image is stored and implemented according to workflows in the cloud orchestrator 313 and the cloud platform's boot loader 302. The boot loader 302 initiates the boot sequence. To accomplish this, the on-prem edge proxy 125 signals the cloud-edge proxy 133 which staging image (315 or 317) to use. The signal is preferably sent through a connection 361 from the management interface 353 to the cloud edge orchestrator 313. The cloud-edge proxy 133 then passes initial connection parameters to the boot loader 302 and initiates the boot sequence. The boot loader then loads blocks belonging to image 315 (or 317), which may be (but does not have to be) partially loaded and cached in 133. When a staging image 315 (or 317) is minimally loaded to the point where it can continue to load itself over the network, it takes control from 302 and continues the bootstrap sequence. One or more additional staging images 317 may be included to provide an initial boot stage for a different OS or guest environments or according to different needs in terms of RAM, CPU, storage performance or special software license requirements.

2.8 I/O and Storage Policies

Once all of the underlying framework is setup, a tiered storage policy is defined. High tiered storage is generally coupled locally to the computing instance 303, to the cloud edge proxy, or as local network storage. Lower tiered storage is generally coupled to the on-prem edge proxy, to another instance, or as on-prem network storage. Tiers of storage can be further divided based on actual or theoretical performance, availability, and recovery requirements. Higher tiered storage generally has faster performance, while lower tiered storage generally has easier recovery capabilities and may offer higher storage capacity at lower cost and smaller footprint.

How an edge proxy directs I/Os depends on the protocol in which it receives information. The cloud edge proxy preferably appears as standard network storage such as SAN accessed through an iSCSI protocol where the cloud edge proxy is the target. In this embodiment, the cloud edge proxy would be considered an apparent network storage device. In other embodiments the proxy can receive information through other software or virtual hardware mechanisms, including but not limited to, traditional parallel SCSI, Fibre Channel Protocol, HyperSCSI, SATA, ATA over Ethernet (AoE), InfiniBand, and DSS. In yet another embodiment, a modification is made by installing a custom driver on the instance 303 to represent a local device through a custom protocol, or through file level protocols such as NFS or CIFS. In yet another embodiment, a modification is made by modifying the cloud hypervisor (not shown) to represent a local device through a custom protocol.

The policy for accessing on premises block storage needs to be arranged on the cloud edge proxy. In an embodiment, computing instances are re-directed to connect to the cloud edge proxy instead of connecting to their typical instantiated virtual disks. In some embodiments, the redirection is done on all attempts to access a virtual disk. In other embodiments, attempts to access a virtual disk are classified to determine how they need to be redirected. Regardless of the manner in which this redirection is set up, the cloud edge proxy uses a policy for determining how to handle read and write I/Os directed to it.

2.8.1 Writes

Writing logic 137 is configured to be cloud-only write persistence or on-prem write persistence. A combination of cloud-only write persistence and on-prem write persistence policy can be applied to a computing instance to differentiate handling of each of its virtual disks. In cloud-only write persistence, all write information for the specified virtual disk of the computing instance is stored locally on the host cloud comprised of one or more public servers. To a certain extent this would be the normal operation of the virtual machine running on the cloud, but in certain embodiments, the cloud edge proxy must determine not to re-route this information or simply to re-route this information back to the virtual machine.

In other embodiments, this information is re-routed through the cloud edge proxy to an associated form of storage such as a virtual disk, but still remains local to the cloud, such that the data is not re-routed to the on-prem edge proxy. Cloud-only write persistence is important for workloads that use and consume storage during operation, but the data is not needed for long term.

In an example of a cloud-only write persistence policy using FIG. 3, a computing instance transferred to 303 is running and the instance 303 directs all read and write calls to the storage target 319. The cloud edge 133 directs all write calls to a virtual disk 308. A special case of local writes relates to areas in the disk that are known to be non-persistent, and hence should not be written-back to the on-premises, thereby saving bandwidth and enhancing the performance for these writes. Examples include the "Swap" file used to handle files that are paged-out of memory and is useless across boots, or the /tmp directory on Linux which is defined to be non-persistent across boots. The system then automatically and transparently maps these files onto a local-only volume. The local only volume may be a virtual volume provided by the cloud edge proxy as a storage target, or an ephemeral virtual or physical disk attached directly to the computing instance, in which case further local network bandwidth savings can be realized. Cloud-only storage can also be configured explicitly through the management console to indicate storage that does not need to persist in on-prem.

An example where cloud-only write persistence is useful occurs when a computing instance has some input data and a workload requires running a multiphase analysis on the data. In this workload, the data may be processed into a local database or transformed into different data that is consumed by another workload, but when the report is complete, there is no need to keep the extra storage. The storage latency must be fast for performance purposes, but all of the information does not need to be reflected back to the on-prem edge proxy, so cloud-only write persistence is used.

For write information determined to be on-premises write persistence, all write information for the computing instance is stored in a deferred write mode where write information is stored locally until it can be sent to the on-prem edge proxy. In particular, writes are first performed locally on the cloud proxy; therefore, they suffer no latency penalty. After a set amount of time—for example, based on specified Restore Point Objective—or a threshold data size is met, these aggregated writes are then transferred over the network to the on-prem edge proxy. Before transferred to the on-prem edge proxy, writes may be aggregated and consolidated to reflect a crash-consistent or application-consistent point in time rather than the total volume of potentially overlapping writes performed, hence further reducing the size of transfer.

In an example of an on-prem write persistence policy using FIG. 3, a computing instance 303 is running and the instance 303 directs all read and write calls to the storage target 319. All write calls are aggregated in the secure cache 323, then streamed to disk management 359 where they are stored in the storage node 129.

An example where on-premises write persistence is useful occurs when one or more computing instances on the cloud platform need access to an on-premises database. Databases are very sensitive to read and write latency. In particular, write latency is an issue because every operation performed in the database is stored in a sequential log or journal. This log is useful for recovery purposes and error reporting if there is a crash or time-stamping the database, so the administrator can effectively roll back the database. However, constant log access for these sequential writes could slow down the overall latency of the network. In order to prevent this issue, these log writes can be aggregated in a "deferred write mode," and then transferred in bulk to the on-premises database through the edge proxies.

Figure 4:
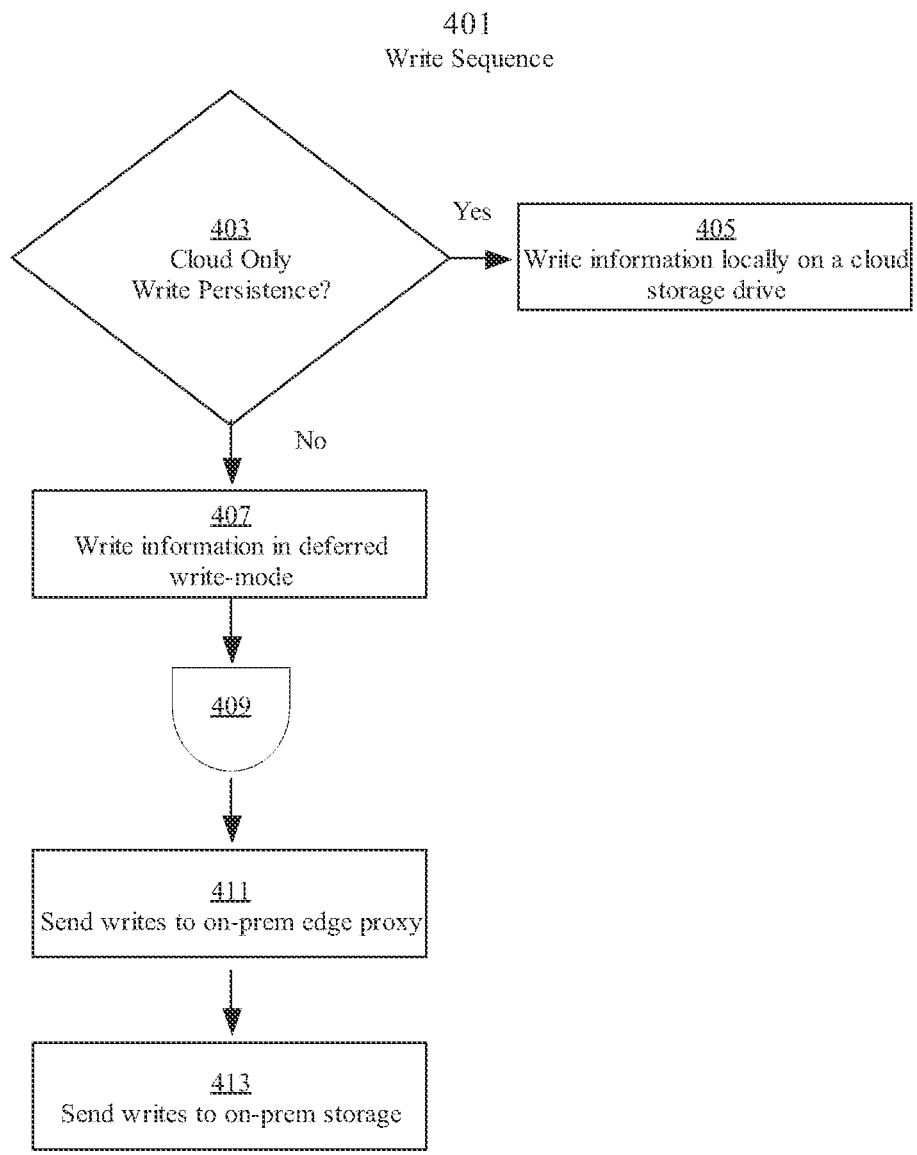
FIG. 4 is a flowchart illustrating a program flow for handling write requests.

FIG. 4 is directed to an embodiment of a process 401 whereby the cloud edge proxy determines how to handle classified write information. The cloud edge proxy first determines if the information is cloud only write persistence 403. This can be done by classifying all writes from a specific computing instance as one type of write persistence or having the instance itself define which calls are cloud only write persistence. If the write is cloud only write persistence, all write information is re-directed to a local storage device on the cloud 405. This can be a secure cache, a local drive on the cloud edge proxy, or a local drive on the instance that made the call depending on how the instance was configured.

As seen in the embodiment in FIG. 4, if the write information is not cloud-only write persistence, then write information is aggregated in a deferred write mode at block 407. After a predetermined amount of delay 409, or the cache is full and a write command arrives, aggregated writes are sent to the on-prem edge proxy at block 411. The on-prem edge proxy can then send the writes to on-prem storage 413. On-prem storage is preferably a virtual disk mounted to the on-prem edge proxy, whereby the disk management component controls this process. However, other embodiments have the on-prem edge proxy sending write calls directly to the physical networked storage or other virtual machines, depending on the needs of the application.

2.8.2 Reads

Reading logic 135 receives read IOs directed to a cloud edge proxy and returns requested information from one of three sources: from the secure cache, from local virtual disks, or from on-prem disks. First, the cloud edge proxy tries to fetch block storage data from the local secure cache. If possible, the cloud edge proxy pulls this data from the cache, and responds with the block storage accordingly. As seen in FIG. 3, an example would be computing instance 303 receiving data from cache 323 after calling storage target 319.

Secondly, when the data is unavailable at the secure cache, the cloud edge proxy will next check other virtual disks on the local system. In some embodiments, virtual disks are connected to the cloud edge proxy. As seen in FIG. 3, an example would be computing instance 303 receiving data from virtual disk 308 after calling storage target 319. In some embodiments, the cloud edge proxy has multiple clones of a single instance, in which case data may also be retrieved from storage belonging to another instance.

Third, when the data is unavailable both from the secure cache and other virtual machines on the local cluster, then the proxy forwards the request to the on-prem edge proxy. In an example embodiment using FIG. 3, an instance 303 makes a call to its target block storage 319, and the cloud edge proxy streams block data from streaming data path 321 from the on-prem edge proxy streaming data path 357. Then the computing instance 303 receives data from disk management 359.

Figure 5:
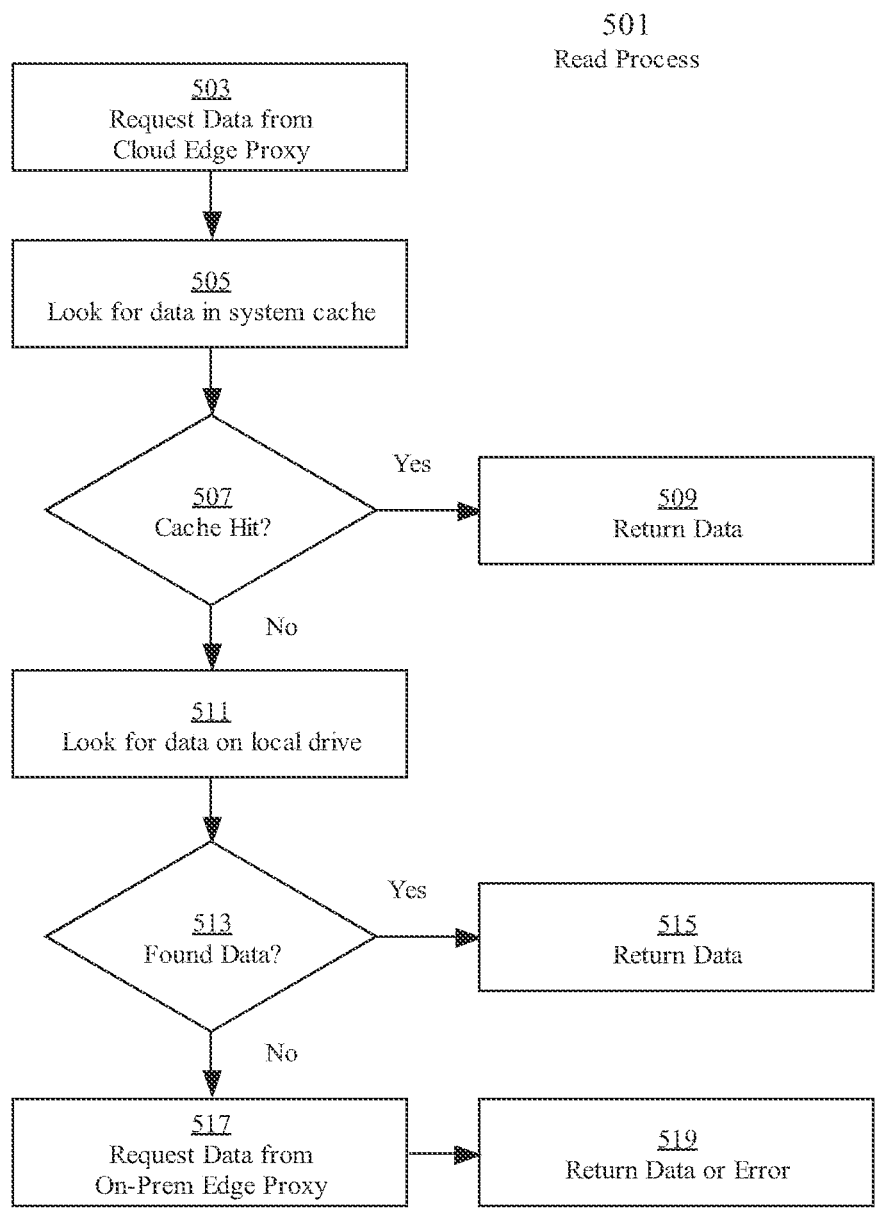
FIG. 5 is a flowchart illustrating a program flow for handling read requests.

FIG. 5 is directed to an embodiment of a process 501 whereby the cloud edge proxy determines how to handle read requests. After a read request from a computing instance in the cloud at block 503, the cloud edge proxy first searches for the data in the system cache at block 505. At block 507, if the information is found in the system cache, then the data is returned to the instance at block 509. If the information is not found in the system cache at block 507, then there is a search for data on the local drives at block 511. If the data is found on the local drives at block 513, then the data is returned to the computing instance at block 515.

Alternatively, if, at block 513, the data cannot be found on the local drives, then the data is requested from the on-prem edge proxy at block 517. Data that is requested from the on-prem edge proxy is returned to the cloud edge proxy from the on-prem edge proxy at block 519. Alternatively, instead of returning the data requested, the on-prem edge proxy may also send the signature of the missing data at block 519, and the system cache, which maintains signatures of cached blocks, can check if the data already exists in the cache, in which case it resorts to "cache hit" scenario and serves the data locally. However, if the data is not found an error is logged and returned.

In some embodiments, depending on how the instance is configured, step 507 can skip directly to block 517 on a "NO" determination. For example, if there are no local drives on the cloud, then there would be no reason to search the local drives.

Several methods are used to improve the "cache hit" ratio. One method is to read ahead—read of larger blocks of data than requested by the OS or application, to improve the throughput. Another method is to anticipate what files will be needed based on locality of reference. For instance, Applications may consist of a number of files, including Dynamically Linked Libraries (DLLs). When the cloud-edge requests blocks from a certain application, the on-prem edge sends immediately blocks that comprise the DLLs, without waiting for the application do to it hence eliminating round-trip delays associated with synchronous request response operation. Yet another method includes profiling recently executed programs, stored in the operating system, and prefetching these programs ahead of time. Some embodiments, require file-level awareness. Since the system reflects a block-device, there is a need to identify what blocks comprise the files being requested. This is done by mounting the virtual disk and allowing the on-prem device to find the blocks associated with the files, creating dependency list of blocks such as if a certain block is fetched, all other blocks should be fetched.

Figure 23:
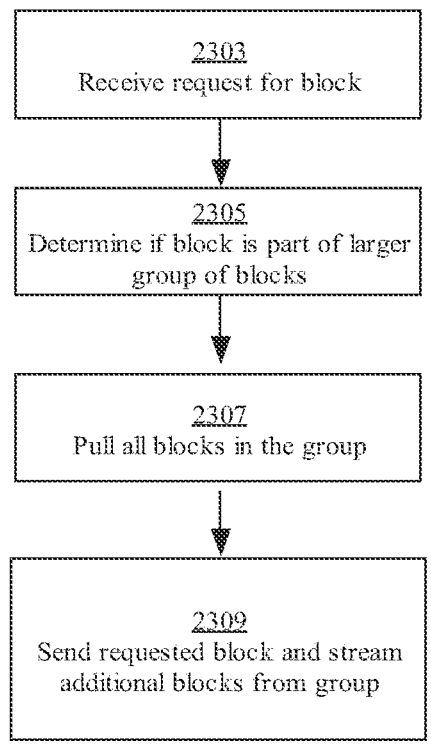
FIG. 23 is a flowchart illustrating a process for improving cache hits.

FIG. 23 is a flowchart illustrating a process for improving cache hits. The process 2301 starts at step 2303 by the on-prem edge proxy 125 (shown in FIG. 1) receiving a request for a block of data from the cloud edge proxy 133. The on-prem-edge proxy then determines if the block is part of a larger group of blocks such as a larger data set, a file, or a set of files at step 2305. At step 2307, the on-prem edge proxy 125 pulls all blocks in the group, and at step 2309, the on-prem edge proxy 125 sends the requested block and streams the additional blocks from the group back to the cloud edge proxy 133.

3.0 Cloud-On-Demand

Using one or more of the above framework elements, an embodiment may provide a Cloud-on-Demand (CoD) platform that enables a dynamic layout of components of an application so as to optimize the layout for cost, performance or capacity. In general, the platform provides configuration details to decouple and recouple the co-location between the computing resources and storage of an instance.

For example, the components of a multi-machine application, which could be either VMs or application containers, can be moved from on-prem to cloud (O2C) while keeping their storage on-prem. In the example embodiment in FIG. 1, instance 107 moves on cloud as virtual machine 141, but its associated local storage resource 109 remains on-prem in network storage node 129 coupled to the on-prem edge proxy 125.

In another example embodiment, the components of a multi-machine application can be moved from the cloud to on-prem (C2O). In an example embodiment using FIG. 6, an instance 141 decouples from its storage 143 and moves on-prem 602 as a computing instance 107, but its storage 653 remains on the cloud 651.

Figure 6:
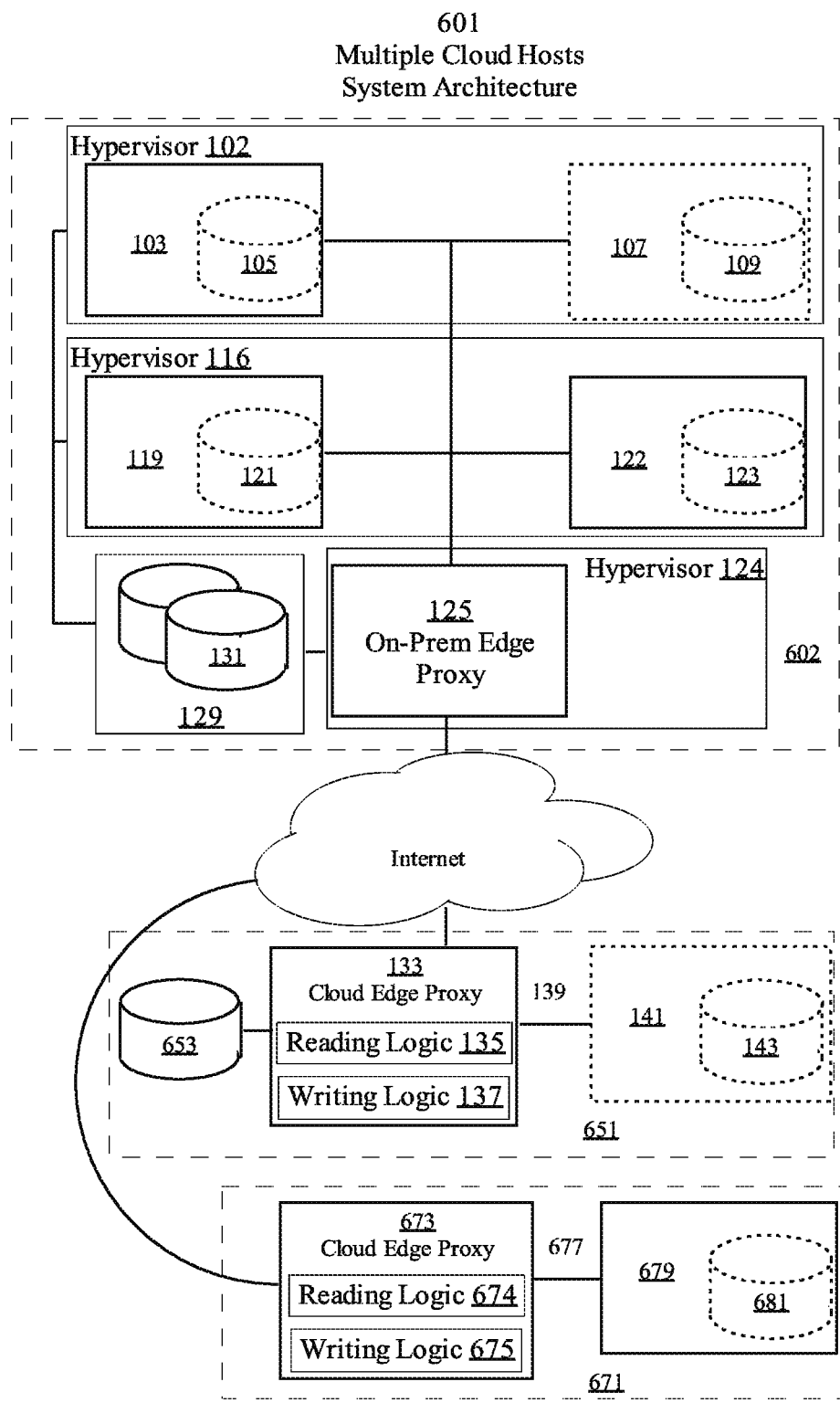
FIG. 6 is a block diagram illustrating a system architecture of a hybridized data center with two cloud hosts.

In a different example embodiment of C2O using FIG. 6, a computing instance 141 (already decoupled from its storage 131) moves on-prem 602 as a computing instance 107, and the storage 131 remains decoupled but gets associated back with instance 107, to the same situation it was before it moved to 141.

In another example embodiment, the components of a multi-machine application can be moved from one cloud to another (C2C). In an example embodiment using FIG. 6, an instance 141 decouples from its storage 143 and moves to a new cloud host 671 as computing instance 679, but the storage 653 remains on the local cloud host 651.

In a different example embodiment of C2C using FIG. 6, a computing instance 141 (already decoupled from its storage 131) moves to a remote cloud host 671 as a computing instance 679, and the storage 131 remains decoupled.

In other embodiments, at least a portion of the storage of a computing instance remains decoupled, and an instance or computing instance is transferred locally to on-prem 602 (O2O), to a cloud host 651 (C2C local), or to a different cloud host 671 (C2C local). In an example embodiment of O2O using FIG. 6, an instance 107 decouples from its storage 109, and the storage 131 remains on-prem 602.

As is further discussed herein, certain embodiments of Cloud-on-Demand also provide a platform to create new instances via cloning, and transfer them to the cloud, thereby enabling to scale-out multiple instances of the same type. These processes may be performed strictly locally or with additional steps to a remote host.

The major benefits of this system are fast movement and seamless transfer of instances to separate hosts and different clouds. The edge proxy setup allows for a change in network layout in minutes. The movement is done without laborious planning by a system administrator, meaning the task time associated with a "migration project" is replaced with streaming instances without the data, and hence reduced to a negligible factor. Furthermore, unlike migration projects where instances and their storage are transformed and replicated to target clouds, here the "transfer" can be started and reversed with ease, such that a hybridized system metrics may be tested rather than theorized before a migration project occurs. Transfers can be done automatically, based on business rules, or through a transparent manual movement where the system administrator does not need to manually configure instances for individual cloud hosts. In short, the system gives administrator flexibility in dynamically determining the layout of instances across multiple clouds.

3.1 Real-Time Instance Transfer

In one embodiment, the term instance transfer is used herein to refer to a main flow implemented to effect a real time transfer of an instance. The term instance transfer is used herein only for convenience to clearly illustrate an example, and other embodiments may implement the same flows and processes without using the term instance transfer. The real time transfer may be O2C, C2O, C2C (local), C2C or O2O as one skilled in the art will readily appreciate.

In the following descriptions, the computing instance starts on-prem and is transferred to a cloud host (O2C), but it should be understood by one in the art that the edge proxies may be used to transfer instances in any of the above described manners. A broader description involves the on-prem instance as a local instance and the on-prem edge proxy as a local edge proxy that facilitates transfer to a remote server with a remote edge proxy. The main example described herein has the instance start on-prem 602, and the on-prem edge proxy 125 decouples the instance from its storage disks. However, the same process can be initiated for an instance 141 starting on a cloud 651, wherein the cloud edge proxy 133 would decouple the instance.

Figure 7:
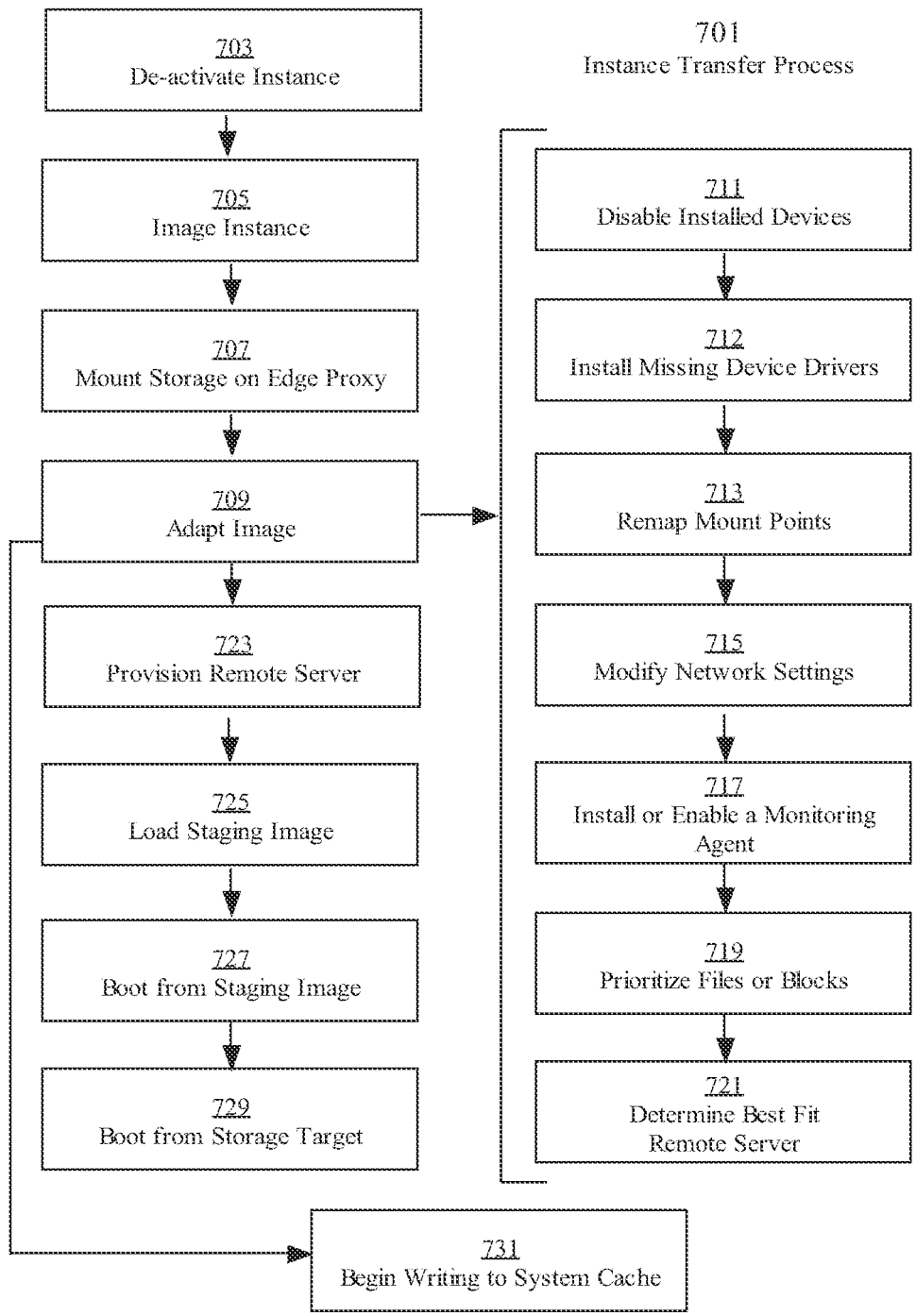
FIG. 7 is a flowchart illustrating a program flow of in an instance transfer process.

In a preferred embodiment, the instance transfer process comprises the steps as seen in FIG. 7, but one or more steps may be performed asynchronously, in parallel, or in a different order in other embodiments. The instance transfer process begins with an instance being selected either manually through the on-prem management system, or automatically following business rules programmed to the management system through its API, to be sent to a selected cloud host. The selection process is further described herein in later sections.

a. De-Activate Instance

In one embodiment, a selected instance is shut down (if powered on) and then gets disconnected from the Host OS by de-activating it at step 703. The instance has dedicated storage mounts such as virtual boot disks, file systems, and networked storage volumes that are locked for exclusive access by the local edge proxy.

The instance typically has hardware elements, software elements, and virtual hardware elements that connect the instance to a physical machine even when the instance is de-activated. These periphery elements can be removed as necessary. Optionally, any underlying connections to the network or other VMs are temporarily removed.

b. Imaging

In a second step, a local snapshot of the instance including its dedicated storage is created at step 705. This snapshot can be used for a quick roll back, reverse cloud bursting, or as point-in-time source for temporary clone-to-cloud operations.

c. Mount Storage on On-Prem Edge Proxy

In a third step, the on-prem edge proxy mounts the instance's storage to the on-prem edge proxy at step 707. In other embodiments, the storage is mounted to an additional storage device connected to the on-prem edge proxy. Under either embodiment, the on-prem edge proxy configures the storage of the instance to appear in its disk management system. The disk management system works in conjunction with the edge proxies to transparently provide storage to the computing instance.

In some embodiments, selected virtual disk or storage volumes may be migrated to a lower tier of storage for lower cost and better performance of the overall system. Simply vacating higher performance storage can increase system performance by providing more storage for the local workloads. In addition costs can be reduced. The reason why these virtual disks can be moved to lower-tiered storage is that the actual execution of applications against the data of that storage is performed in the cloud, whereas the on-prem storage is only used to handle the deferred and limited read-write activity by the cloud-edge. Hence, the IO sub system on-prem is offloaded by the cloud IO system in terms of throughput and performance.

In some embodiments, the on-prem edge proxy classifies one or more storage disks as cloud only write persistence or on-prem write persistence. In these embodiments, additional virtual storage disks are created and mounted on the cloud edge proxy when cloud only write persistence is selected.

For example in FIG. 3, virtual disk 308 is created to accommodate cloud write persistence of computing instance 303.

d. Adaptations

The on-prem edge proxy performs a quick analysis of the instance to be moved in step 709. The analysis includes determining OS type and version, assigned computing and storage resources, boot device and file-systems, data storage mount points, installed virtualization components, device drivers, namespaces and network configurations and license type. Based on the analysis, adaptations are applied to the imaged instance, including but not limited to (i) disabling installed devices, features and components which may not be compatible with target cloud at step 711; (ii) installing device drivers that match the target virtual hardware at step 712; (iii) remapping mount points to the edge appliance at step 713; (iv) modifying network settings at step 715; (v) installing or enabling a monitoring component to integrate with preferred cloud instance health reporting, if different than what is used on-prem at step 717; (vi) prioritizing potential storage to be pre-fetched at step 719; (vii) determining a best-fit remote server type, accounting for RAM, CPU, storage performance and special software license requirements (e.g. 3rd party database software) at step 721.

(i) Disable Installed Devices, Veatures and Components

In an embodiment, drivers and auxiliary software are removed or disabled from the instance to fully isolate the instance from the host in step 711.

Some virtual hardware is necessary for running an instance on the underlying host operating system. This virtual hardware reflects to the instance and causes associated drivers to be installed. This virtual hardware also causes associated device paths and locations to be registered in the instance. Additionally, there is usually auxiliary software installed within the instance to facilitate communication between the instance and the underlying virtualization environment. This auxiliary software may communicate with the host OS or enforce instance behaviors that are necessary for the host OS in the local network, but may be irrelevant for a host OS located remotely.

In an embodiment, this auxiliary software is removed or disabled to fully isolate the virtual machine from the host OS, and any additional drivers or virtual hardware installed on the instance are disabled.

(ii) At step 712, some virtual hardware is necessary for running an instance on the underlying host operating system. If the virtual hardware on which the instance is running on-prem is different than the target cloud hardware, then it may be the case that the relevant device drivers may not exist on the current image, in which case they need to be installed offline, prior to booting them on the target hardware.

(iii) Remap Mount Points

Another embodiment includes remapping mount points from current virtual storage devices or networked storage to their proxied addresses as reflected by the cloud edge proxy in step 713. These changes will be reflected upon booting the computing instance remotely. The cloud host OS will receive a list of available storage devices to be accessed through virtual hardware elements like a SCSI bus or a fiber channel and the virtual storage devices appear as local drives.

In one embodiment, when an instance is adapted to a remote host, it storage is remounted to appear as a standard network storage such as SAN. This standard network storage is preferably accessed through iSCSI, but in other embodiments the storage may be accessed through other software or virtual hardware mechanisms, including but not limited to, traditional parallel SCSI, Fibre Channel Protocol, Hyper-SCSI, SATA, ATA over Ethernet (AoE), InfiniBand, and DSS. In other embodiments, a modification is made to the instance by installing a custom driver to represent a local device through a custom protocol. The virtual storage devices and virtual hardware elements as they appear in the guest OS are modified depending on which mechanisms are used to reroute the data path.

In some embodiments, the on-prem edge proxy classifies one or more storage devices as cloud only write persistence or on-prem write persistence. Storage device paths may need to be split and re-routed to multiple different storage devices (some on-prem and some on cloud), in order to accommodate cloud only write persistence or other tiered storage needs.

(iv) Modify Network Settings

An aspect of an embodiment includes modifying network settings that may not be applicable to the cloud-side network, or as designated by the administrator in the task definitions at step 715. The networking elements need to updated or deleted, so the instance can be transferred. In a preferred embodiment, networking addresses and representations on the instance are modified to reflect a new location on the cloud. These modifications include updating networking services such as DNS, routing services, and other network devices such as NAS or a directory service.

In one embodiment, at least some networking configurations are deleted for later configuration on the cloud. At least some of these settings can be configured during the first stage of a cloud hosted boot sequence.

(v) Install or Enable a Monitoring Agent

An aspect of an embodiment includes installing or enabling a monitoring agent at step 717. Any instance created in the cloud preferably has an agent enabled or installed and mounted on the instance that communicates with the cloud edge proxy. The cloud edge proxy then preferably translates this monitoring information, so it can be fed via the transport layer to the management service.

Monitoring information comprises storage latency, task times, CPU usage, memory usage, available system resources, and error reporting.

(vi) Prioritize Pre-fetched Storage

Another aspect of an embodiment includes estimating and prioritizing potential candidate files and/or corresponding blocks to be pre-fetched by the cloud side cache for a correct boot or efficient execution in the cloud at 719.

To accomplish this, the on-prem edge proxy is set up to map files that are likely to be accessed in the boot sequence or run state to their corresponding logical block addresses (LBAs). In a preferred embodiment, these blocks reflect previous modifications to the network settings and virtual storage devices.

Figure 21:
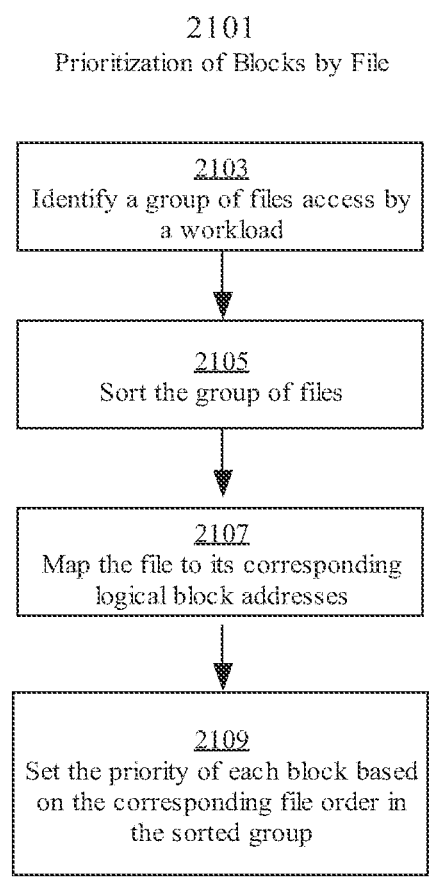
FIG. 21 is a flowchart illustrating a process for prioritization of blocks by file.

The files can be determined through a static analysis or a dynamic analysis. FIG. 21 is a flowchart illustrating a process for prioritization of blocks by profiling the files used in a workload or boot process. At block 2103, the process starts by identifying a group of files accessed by the workload. For example, if the boot loading process is the current workload, this step occurs by recording the files initially accessed by the boot sequence. For other workloads, this analysis may turn on the use of accounting services provided by the guest OS. For example, MS Windows keeps an accounting of what files are being accessed on a regular basis. At block 2105, the group of files identified are sorted based on how often or how early they are accessed. For example, in a boot loading process, the files that are sequentially accessed, giving a natural sorting order for the files. For other workloads, the sorting may be based on how often a filed is accessed over a given period. Once each file is sorted, each file may be mapped to a range of logical block addresses at block 2107. Then these logical block addresses are prioritized based on the corresponding file order in the previously sorted group at block 2109.

Figure 22:
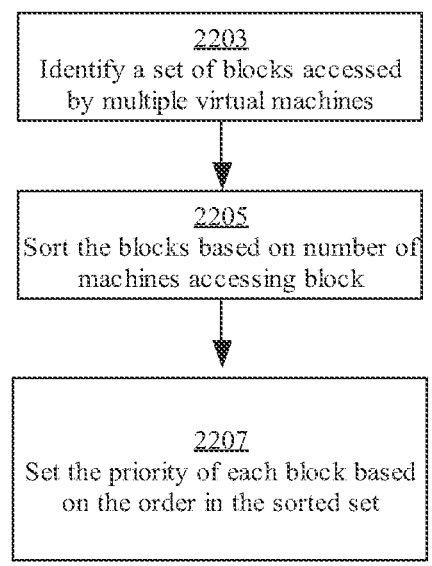
FIG. 22 is a flowchart illustrating a process for prioritization of blocks by hotspot analysis.

A dynamic analysis involves accessing an instance through the underlying virtualization environment to see what block storage is routinely accessed. FIG. 22 is a flowchart illustrating an algorithm for prioritization of blocks by hotspot. In this analysis technique 2201, the on-prem edge proxy follows how many virtual machines access similar portions of block storage. The process starts at block 2203 by identifying a set of blocks access by multiple virtual machines. The blocks are then sorted based on how many virtual machines are accessing the same block 2205. At block 2207, if many machines access the same block storage, then these blocks are considered hot, and they have a higher priority than blocks that are accessed by less machines.

In another embodiment, a hybrid algorithm is used that leverages information from a group of one or more of static and dynamic analysis techniques.

By using one or more of these static and dynamic analysis techniques, the on-prem edge proxy determines which block storage is accessed most often for an instance. The on-premises edge proxy then prioritizes the block level storage for an instance based on how often particular blocks are accessed and how early these blocks are accessed for a particular application or for the boot process or a particular workload. These blocks may be streamed in order of priority from the on-prem edge proxy to the cloud edge proxy at block 731 in FIG. 7.

(vii) Determine a Remote Server

Another aspect of an embodiment includes finding a best-fit remote server, accounting for RAM, CPU, storage performance and special software license requirements (e.g. 3rd party database software) in step 721. The on-prem edge proxy extends the data center by transferring individual components in a multi-machine application to a remote server that meets the needs of each component in terms of capacity, performance, cost, or any combination thereof. Different computing instances may be offered to maximize these needs to different degrees. The local edge proxy has a list of provisionable computing instances. Determining the proper computing instance includes matching the resources of the on-prem instance with the resources available remotely. One way to assess this is to extract the resources that are used on-prem, and map them to a cloud instance with similar resources. This may include determining how many CPUs, how much RAM, and how many Input/Output Operations Per Second (IOPS) are required by the image.

e. Provision Remote Server

In some embodiments, a remote server may be provisioned at step 723 based on the specifications determined from step 721. In a preferred embodiment, the remote server 802 comprises a virtual remote server, where multiple instances of different types of remote servers may be created. After determining how many CPUs, how much RAM, and how many Input/Output Operations Per Second (IOPS) are required by the image, the edge proxy 133 may provision a remote server 802 of a type having these parameters.

f. Begin Writing to System Cache

In an embodiment, blocks determined in step 719 are written to the secure cache on the cloud edge proxy at step 731. This process is done asynchronously or in large chunks such that calls made from the cloud edge proxy 133 to the on-prem edge proxy 125 will not be slowed.

g. Load the Staging Image

In some embodiments, loading the staging image includes transferring the staging image from the remote proxy to the provisioned remote server.

Figure 8:
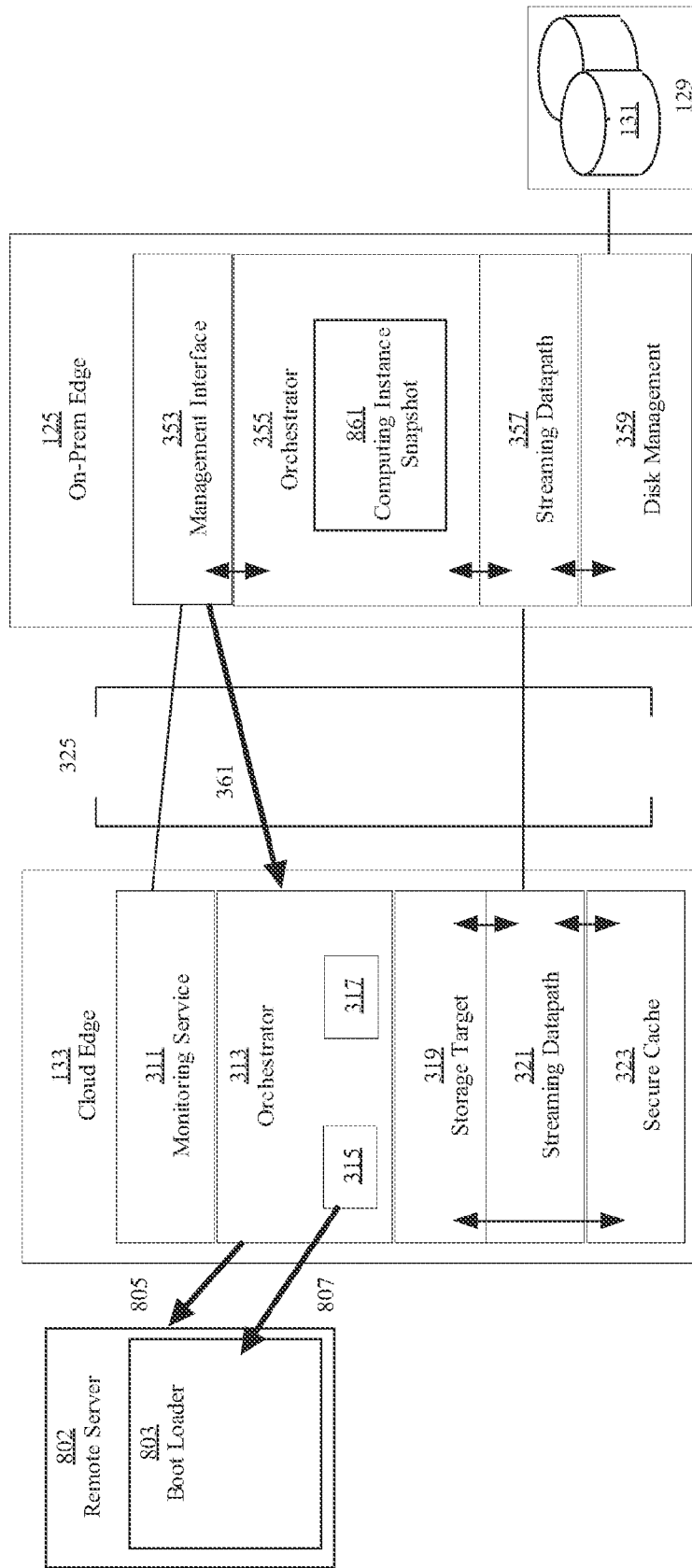
FIG. 8 is a system blueprint illustrating an edge proxy system loading a staging image.

In one embodiment, loading a pre-imaged staging image starts the boot sequence at 725. In an embodiment as seen in FIG. 8, the cloud platform provides an image or service that contains at least one boot-loader 803. A boot loader is a program that loads an operating system. Examples of boot loaders include, but are not limited to, LILO and GRUB, and also include paravirtual boot loaders such as PV-GRUB.

The boot loader 803 initiates the boot sequence of the staging image 315 determined in step 709. To accomplish this, the on-prem edge proxy 125 signals the cloud-edge proxy 133 which staging image (315 or 317) to use. The signal is preferably sent through a connection 361 from the management interface 353 to the cloud edge orchestrator 313. The cloud-edge proxy 133 then passes initial connection parameters to the boot loader 803 and initiates the boot sequence. The initial connection parameters and communication to initiate a boot sequence are preferably sent through a connection 805 of the cloud orchestrator 313 to the boot loader 803. The boot loader 803 then connects 807 to the staging image 315 on the cloud edge proxy 133 and loads the staging image specified.

In an alternative embodiment, an on-prem Orchestrator 355 may directly provision and configure the boot loader 803 through an instance management API provided by the cloud provider, hence controlling the full configuration picture and provisioning operation across the various components, without delegating higher privileges or special access rights to individual components in the cloud. This alternative embodiment may be used in deployments where the on-prem environment has higher trust or security level than the cloud environment.

During this time, boot instructions for the computing instance 861 are being streamed to the secure cache 323.

h. Booting from a Staging Image

At step 727, the staging image boot sequence contains a partial image of a boot sequence and additional software components necessary to connect the booting instance to disks outside the cloud edge proxy. The partial image is OS-specific, containing the initial boot sequence for a specified OS. The additional software components facilitate connecting the staging image to virtual disks that appear to be located on the cloud edge proxy. For example, these additional software components may be a software initiator using an iSCSI protocol.

Figure 9:
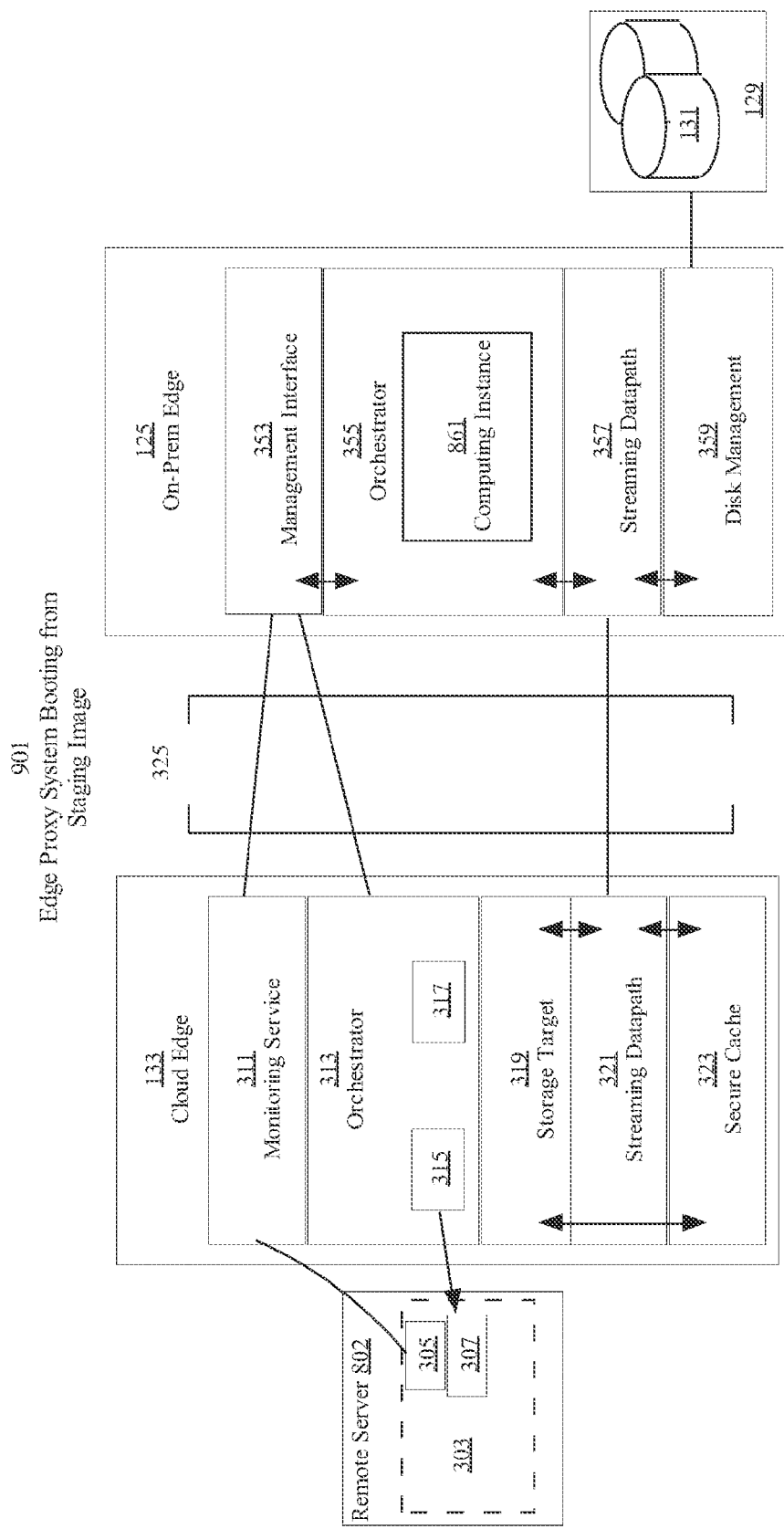
FIG. 9 is a system blueprint illustrating an edge proxy system booting a partial OS from a staging image.

In an embodiment as seen in FIG. 9, the staging image 315 begins a partial OS 307 and a monitoring agent 305. In a preferred embodiment, the monitoring agent 305 connects to the monitoring service 311, while the partial OS 307 receives boot instructions from the staging image 315. In a preferred embodiment, the staging image 315 is only a partial image and does not contain enough boot instructions to start a full computing instance 303.

i. Booting from a Storage Target

At step 729, the rest of the computing instance 303 boots through a network boot image rather than the staging image previously discussed. The boot sequence streams through the proxy system from an on-prem disk 131 mounted in step 707, but the transfer process is significantly sped up by the system caching created in step 719 and loaded in step 731. If a boot instruction is not available in the system cache, then it is pulled from on-prem.

Figure 10:
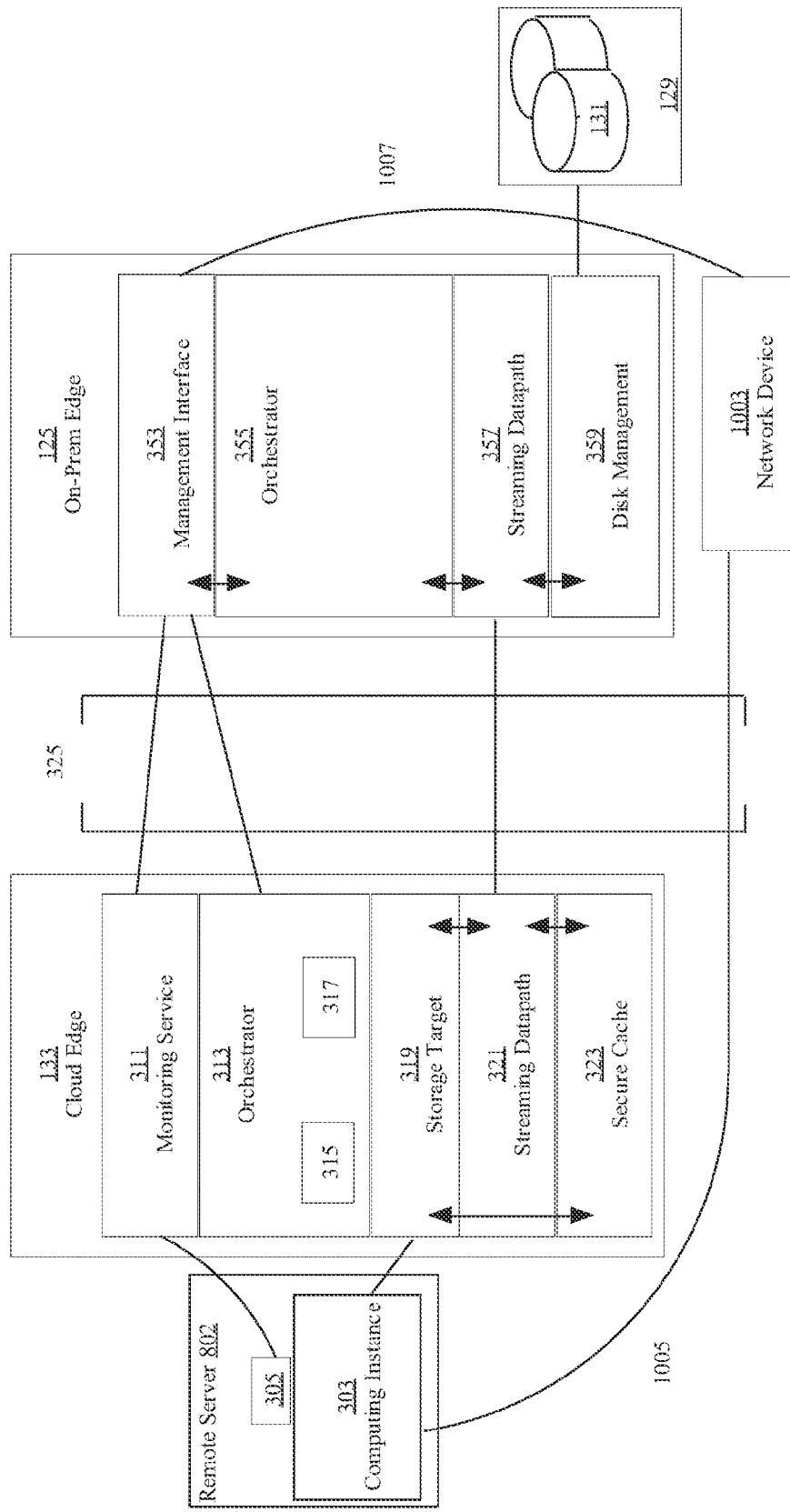
FIG. 10 is a system blueprint illustrating an edge proxy system booting a computing instance from a storage target.

FIG. 10 is a system blueprint illustrating an edge proxy system booting a computing instance from a storage target. The boot sequence is transferred from the staging image 315 to the storage target 319 within the cloud edge proxy 133. The network boot occurs through the network connection between the computing instance 303 and the storage target 319. Under this framework, the rest of the boot sequence and application information can be transferred to the computing instance 303.

Figure 11:
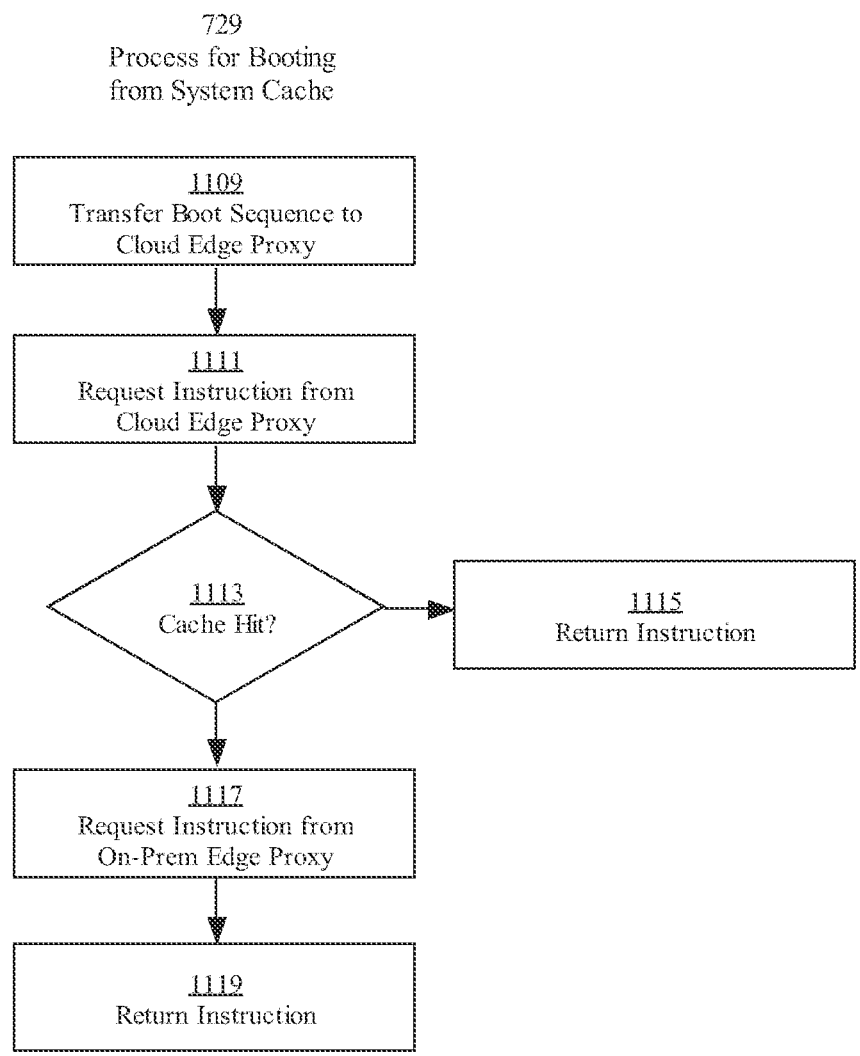
FIG. 11 is a flowchart illustrating a program flow to receive boot instructions for a computing instance boot.
Figure 12:
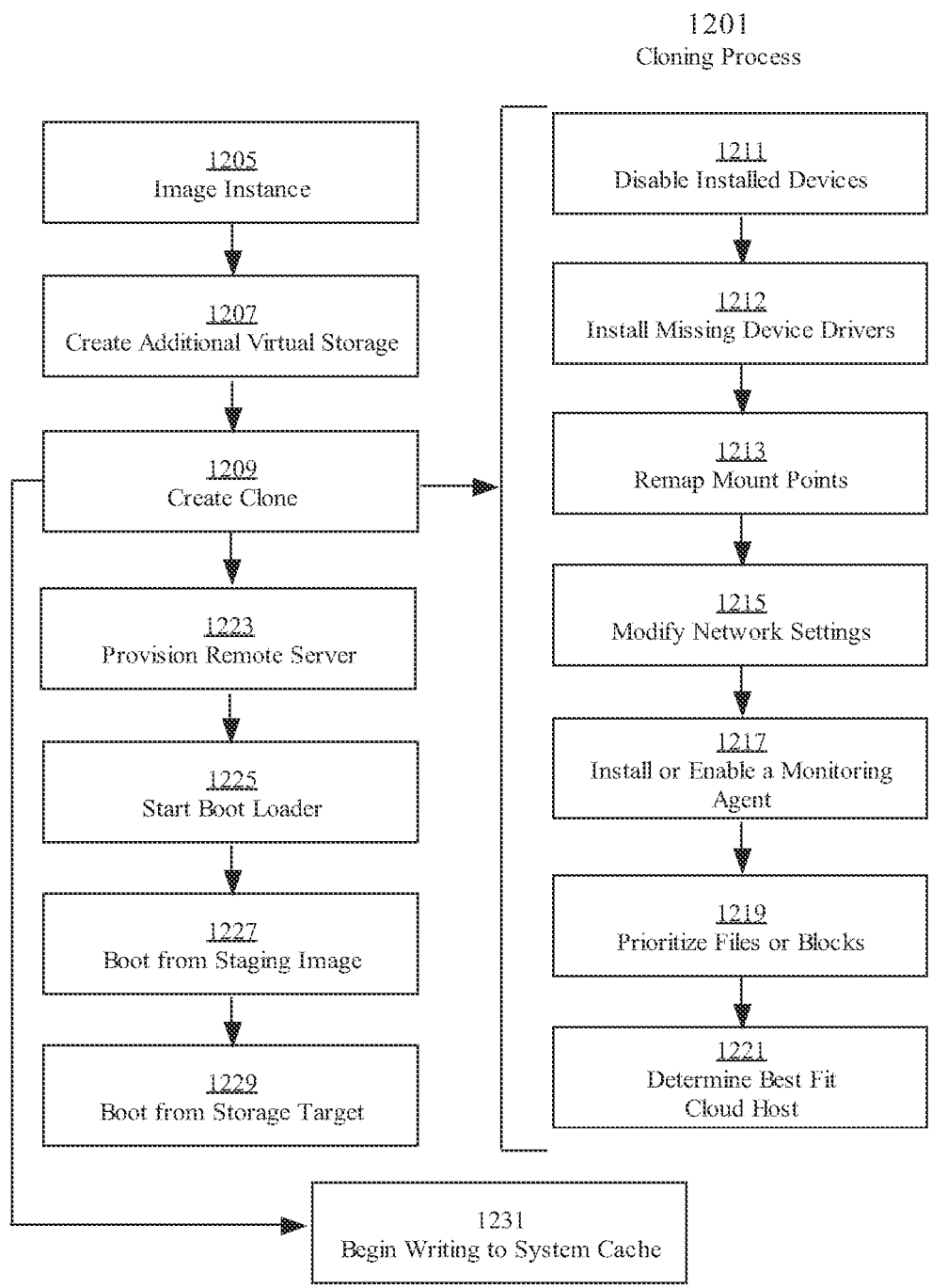
FIG. 12 is a flowchart illustrating a program flow of a cloning process.

FIG. 11 is a flowchart illustrating a program flow to receive boot instructions for a computing instance boot under the system blueprint shown in FIG. 10. The process for reading the cache for booting instructions of the computing instance 729 begins when the boot sequence is transferred from the staging image boot sequence to the computing instance boot sequence at step 1109. At this point, the cloud edge proxy 133 has at least some of the prioritized blocks from the on-premises edge proxy stored in a secure cache 323. When a specific boot instruction is needed at step 1111, the cloud edge proxy fetches block storage data first from the local secure cache. When the data is available at decision point 1113, it is returned to the booting computing instance at step 1115. When the data is unavailable from the secure cache on the local cloud network at decision point 1113, then the proxy requests additional boot instructions from the on-premises edge proxy at step 1117. Because the original image is on-prem, the instruction can be returned at step 1119. Additional error reporting may be built into this process to optimize cache hits and handle loss of instructions.

Turning back to FIG. 10, the running instance 303 will have any previously modified references set to associated virtual disks 131 in the cloud edge proxy. References that do not need to be re-routed through the proxy system are accessible directly through the transport layer 325. In some embodiments, network devices 1003 or other instances may be re-routed through the cloud edge proxy 1007 or simply directly accessed 1005 through the transport layer 325.

At this point, the computing instance 303 is running in the cloud with its dedicated storage proxied by the cloud edge proxy 133. Further optimizations for storage performance, security, data transfer efficiency and data deduplication may be employed by the cloud edge proxy for better storage and application response time. The optimizations may be applied immediately according to a feedback system using the monitoring service 311 or in accordance with workflows previously setup by a system administrator.

Many of the embodiments herein described refer to the instance starting on-prem with a local on-prem edge proxy available and a remote cloud edge proxy available. These descriptive embodiments are purely for instructive purposes. Any and all of these steps may be performed on an instance that starts in the cloud with a local cloud edge proxy available and one or more remote edge proxies available on-prem or on another cloud host.

For example, the embodiments describing an on-prem edge proxy 125 described in FIGS. 8, 9, and 10 can translate to using a cloud edge proxy instead, such as the cloud edge proxy 133 in FIG. 6. The instance transfer process of C2O would be a transfer of an instance (141 with 143) or a computing instance (141 without 143) from the cloud 651 to on-prem 602. The local edge proxy would be a cloud edge proxy 133 instead of an on-prem edge proxy 125 as described in FIGS. 8, 9 and 10. The remote edge proxy would be an on-prem edge proxy 125.

Similarly, the instance transfer process described in FIGS. 8, 9, and 10 describing an on-prem edge proxy 125 can be analogized to a cloud edge proxy 133 in FIG. 6 for a C2C.

The transfer here is from the cloud 651 having a local cloud edge proxy 133 to another cloud 671 having a remote cloud edge proxy 673.

In embodiments where the local edge proxy is on the cloud, the local edge proxy preferably does not have a management interface. Instead, the communications of the management interface are independently sent from the on-prem edge proxy. In these embodiments, the local edge proxy preferably does not have a disk management service, but instead the storage target directly manages I/O.

In other embodiments, the cloud edge proxy may contain additional components such as a management interface or a disk management service. These components can be independently configured through a VPN connection.

3.2 Stateless, Stateful and Run-Time Instance Transfer

Another feature relates to transferring more or less information depending on whether the workload to be transferred is stateless, stateful, or requires run-time information to seamlessly transfer.

The form of instance transfer can be stateless, stateful, or run-time. In a stateless transfer, the persistent memory is remounted in the disk management system of the on-prem edge proxy as discussed in step (c), but no data is replicated in the volatile memory or CPU components of an instance as it is booted. In contrast, instance transfer of a stateful or run-time instance includes capturing and replicating state information or the run-time information of a machine. State information may include volatile memory and session variables associated with a particular instance. The run-time information of a machine may additionally comprise the CPU execution, the in memory CPU instruction set, the memory state and register values, as well as run-time variables.

Capturing the state or run-time information of a machine occurs as an additional step in the decoupling process. In addition to imaging the disk volumes and hardware set of an instance, the information needs to be captured. When determining a best fit staging image, these configurations are additionally taken into account.

Replicating the state or run time information of an instance occurs as an additional step in the boot process. In addition to booting the computing instance from target storage, the CPU, in memory CPU instructions set, the memory state, and register values are replicated from the target storage.

Manipulation of virtual hardware or even state information on a cloud host often presents security issues to the cloud provider. Because complete access is often considered a security issue by the cloud host provider, other embodiments exist on a spectrum between cold booting and a run-time transfer.

Other embodiments include temporarily putting an on-prem instance into standby or hibernation mode to capture at least some stateful or run-time information. In this manner, this additional information may be captured and replicated to fully enable a computing instance before commencing computational operations.

3.3 Cloning

Cloning refers to the process of sending a clone of an instance on-prem to the cloud without necessarily de-activating the instance being cloned. In addition to the benefits of having more machines working in a multicomponent application, this process can be useful in creating additional forms of storage, testing moving an instance to a cloud host, and creating storage by allotting cloud write persistence to an instance.

The cloning process has many steps similar to the instance transfer process. Rather than reproducing those steps in their entirety, the steps are presented here in a summary fashion with the difference between the steps highlighted.

Using the management interface, an administrator or automated administrator selects a local computing instance to clone and optionally identifies a remote host. If a remote host is chosen, the remote host must have an edge proxy distinct from the local edge proxy. If a clone is to be created on the local host, some additional steps herein described are added or removed to optimize performance. Some of the embodiments herein describe will focus on cloning a computing instance located locally on a cloud host to highlight the differences in performing such an action.

In a first step 1205 for cloning, a snapshot of the selected computing instance and any local storage is created. The dedicated storage of the computing instance located on-prem is optionally additionally taken. If the computing instance selected has cloud-only write persistence, the snapshot may be used later as an additional source of boot instructions and application reads.

In a second step 1207 for cloning, a new set of virtual disks or storage volumes are cloned from the snapshot. If the clone has cloud only write persistence, the cloned storage is created locally on the cloud. If the clone has on-prem write persistence, the cloned storage is created on-prem.

If the computing instance selected has cloud-only write persistence and the clone has cloud-only write persistence on the same local cloud host, the storage volume for the clone optionally does not need to be created because the clone and the computing instance may use the same source storage. In an example embodiment according to FIG. 13, the selected computing instance 1363 has cloud only write persistence stored in storage volume 1353. The cloned computing instance is also selected to have cloud-only write persistence, so a second storage volume need not be created.

In a third step 1209 for cloning, the local edge proxy performs a quick analysis of the instance to be cloned including, but not limited to, OS type and version, assigned computing and storage resources, boot device/file-system, data storage mount points, installed virtualization components, namespaces and network configurations. Based on this analysis, a clone is created preferably from the snapshot taken in the first step with the following adaptations.

(i) In a first adaptation step 1211 of the cloning process, installed devices, features, and components which may not be compatible with target cloud, are disabled. In addition, instance state that cannot be duplicated over multiple instances needs to be re-generated and configured properly. For instance, machine name/ID needs to be unique and hence recreated on the clone, and then the machine needs to join the domain. Optionally, this step is not necessary if the clone is created locally. For example, in the example embodiment disclosed in FIG. 13, the clone 1365 to be created from the selected computing instance 1363 is local, so it does not need to disable any questionably compatible devices.

(ii) In a second adaptation step 1212 of the cloning process, if the virtual hardware on which the instance is running on-prem is different than the target cloud hardware, then it may be the case that the relevant device drivers may not exist on the current image, in which case they need to be installed offline, prior to booting them on the target hardware.

(iii) In a third adaptation step 1213 of the cloning process, the mount points are remapped from current virtual storage devices or networked storage to their proxied uniform resource identifiers (URIs) or addresses as reflected by the edge proxy system. Optionally, this step may be removed or significantly paired down if the clone is created locally and the same storage source is being used. For example, in the example embodiment disclosed in FIG. 13, the clone 1365 to be created from the selected computing instance 1363 can use the same source storage either 131 or 1353.

(iv) In a fourth adaptation step 1215 of the cloning process, network settings may need to be modified.

(v) In a fifth adaptation step 1217 of the cloning process, a monitoring component is installed or enabled to integrate with the monitoring service of the local edge proxy.

(vi) In a sixth adaptation step 1219 of the cloning process, candidate files or corresponding storage LBAs are prioritized to be pre-fetched by the system-cache for an optimized boot and efficient execution of the cloned computing instance.

(vii) In a seventh adaptation step 1221 of the cloning process, a best fit remote server is determined, accounting for RAM, CPU, storage performance and special software license requirements (e.g. 3rd party database software).

In a fourth step 1223 for cloning, the type of remote server from 1221 is provisioned through the cloud edge proxy.

In a fifth step 1225 for cloning, a pre-imaged staging image is loaded by a boot loader and initial connection parameters are passed to the boot loader.

In a sixth step 1227 for cloning, the staging image boots and creates the proxy system paths necessary to transfer the boot sequence to the target storage of the edge proxy.

In a seventh step 1229 for cloning, the rest of the computing instance is booted through a network boot image rather than staging image previously discussed.

Figure 14:
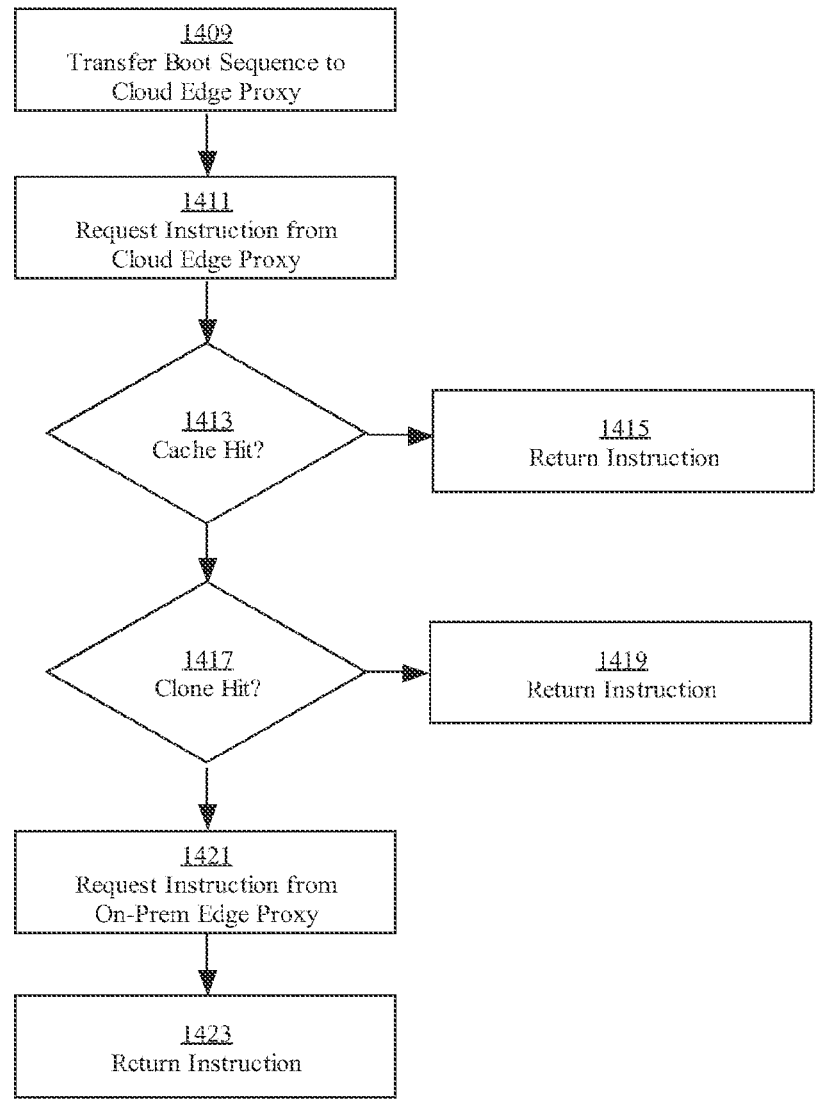
FIG. 14 is a flowchart illustrating steps to receive boot instructions for a computing instance when another computing instance is local.

As seen in FIG. 14, the booting sequence of the computing instance in step 1401 begins when the boot sequence is transferred from the staging image boot sequence to the computing instance boot sequence in step 1409. At this point, the cloud edge proxy has at least some of the prioritized blocks from the on-premises edge proxy stored in a secure cache. When a specific boot instruction is needed in step 1411, the cloud edge proxy fetches block storage data first from the local secure cache. When the data is available in step 1413, it is returned to the booting computing instance in step 1415. When the data is unavailable at the secure cache in step 1413, the cloud edge proxy will next check other instances on the local cloud system to see if the data can be cloned from one of these instances in step 1417. If the data is available in a local instance, then it is simply returned in step 1419. When the data is unavailable both from the secure cache and other instances on the local cloud network in step 1417, then the proxy requests additional boot instructions outside the firewall from the on-premises edge proxy in step 1421.

Figure 13:
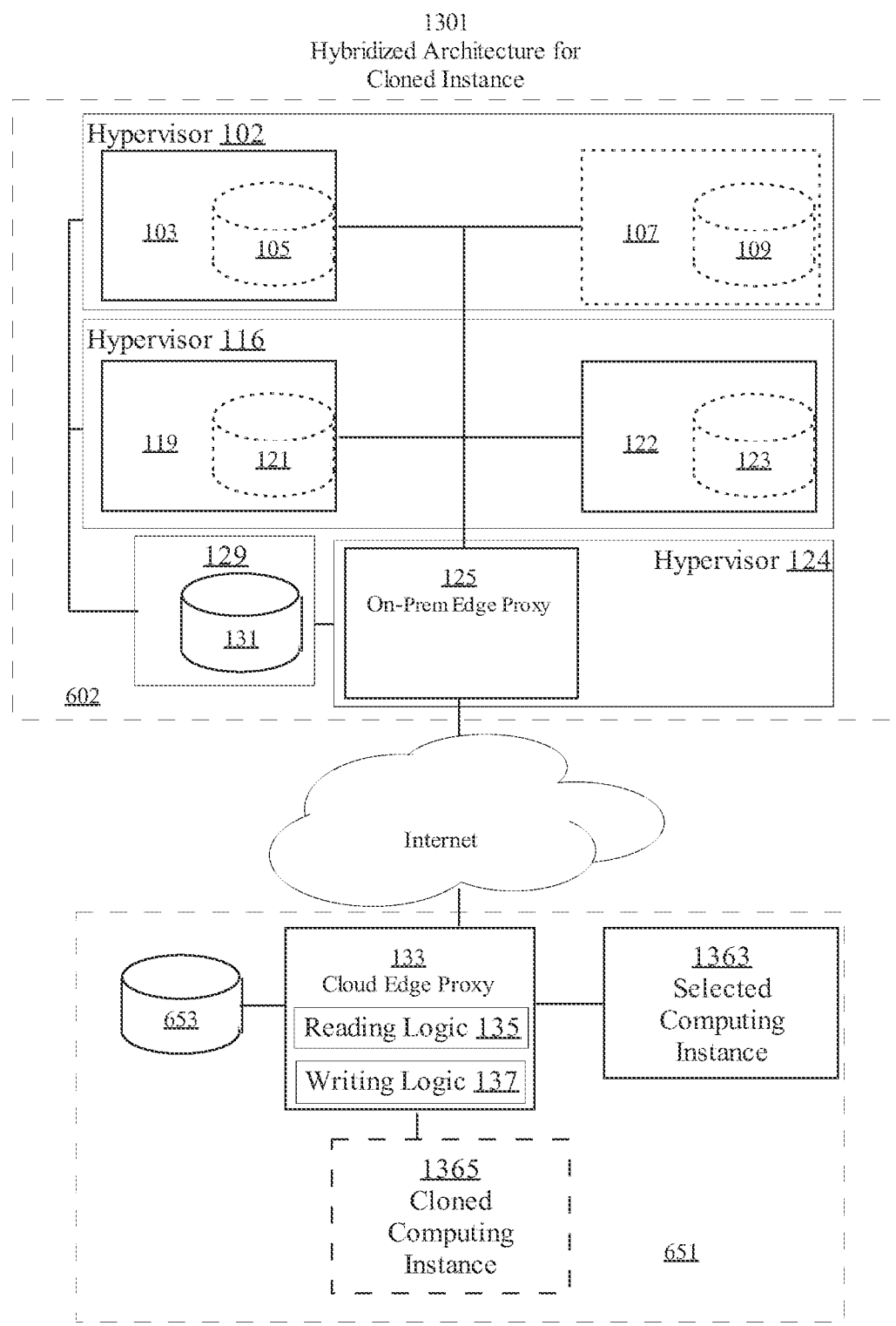
FIG. 13 is a block diagram illustrating a system architecture of a hybridized data center with a cloned computing instance.

Turning back to the example embodiment in FIG. 13, the running clone 1365 will have any previously modified references set to associated virtual disks (131 or 653).

3.3 Cloning Cut-Overs

In certain embodiments, it is desirable to clone a selected instance or computing instance and then cutover control of a workload to the clone at the same time the selected instance is disabled. In the example embodiment discussed the selected instance is on-prem and the clone is targeted to a cloud host. However, this process may be performed locally to transfer an instance from one host to another host, or this process may be performed on a cloud host to transfer an instance from one cloud host to another cloud host. The embodiment presented herein is meant for instructive purposes.

Figure 15:
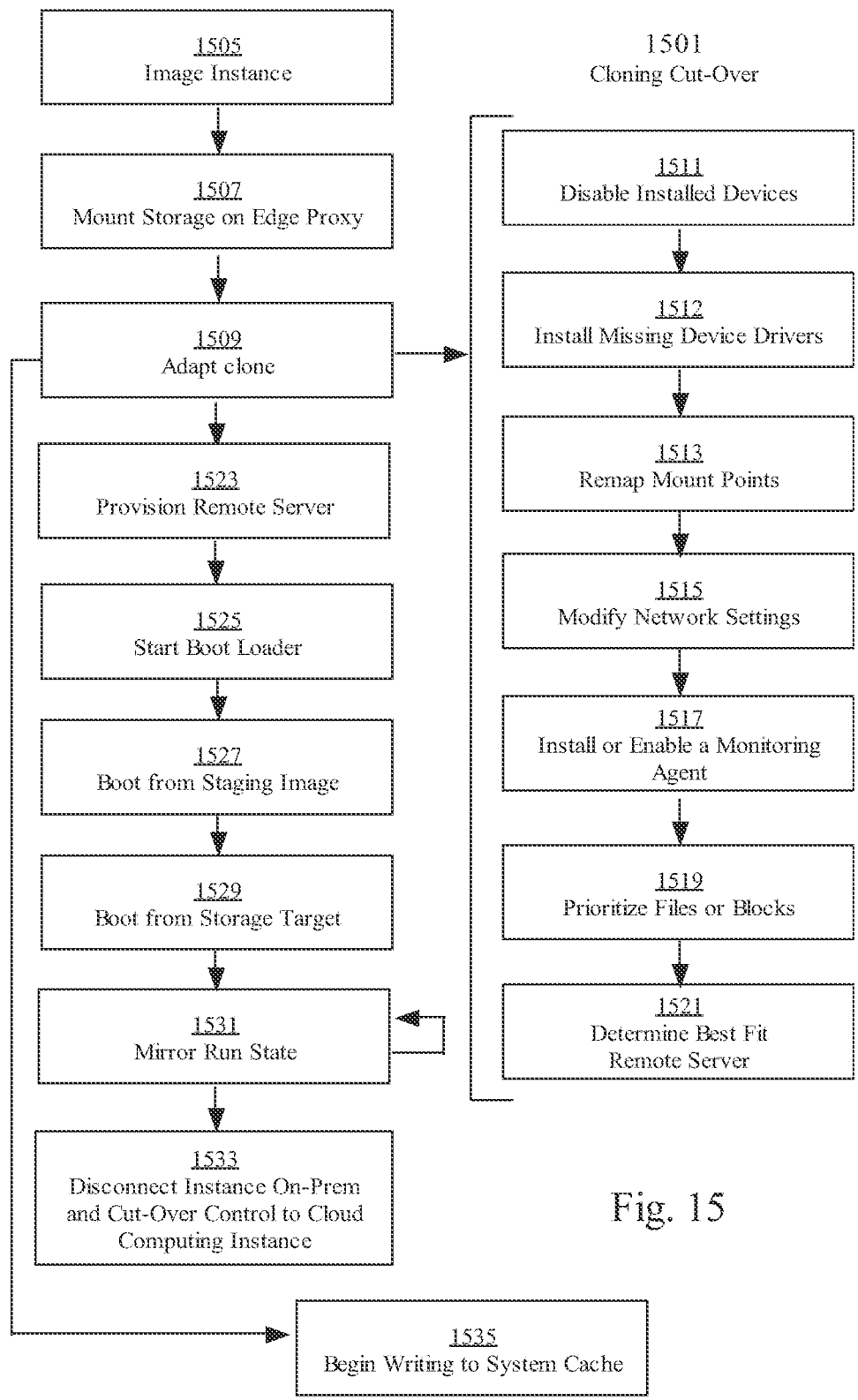
FIG. 15 is a flowchart illustrating steps in a cloning cut-over process.
Figure 16:
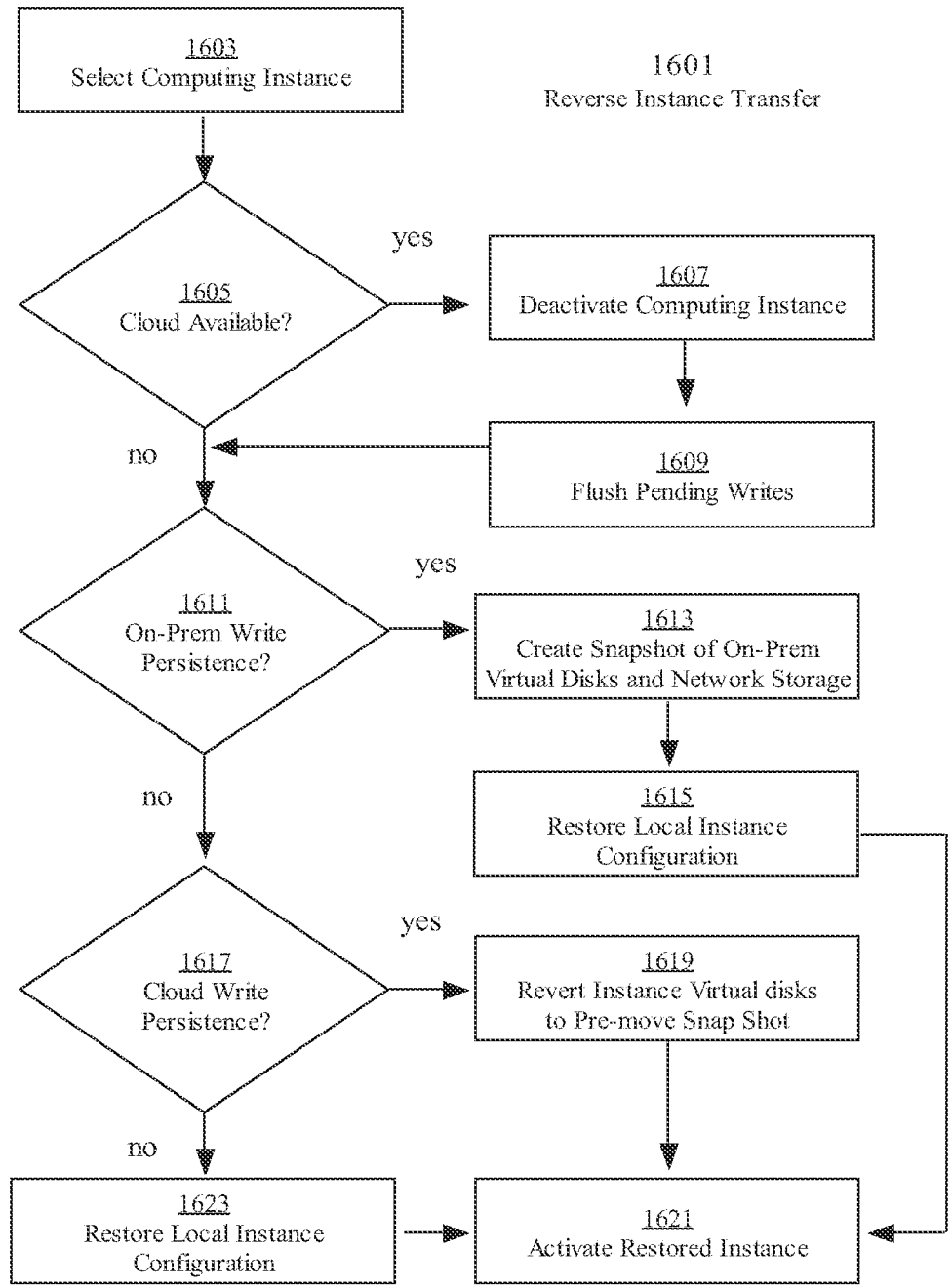
FIG. 16 is a flowchart illustrating steps to reverse an instance transfer process.

An example of the one or more cloning cut-over steps is shown in FIG. 15. The cloning cutover process has many steps similar to the instance transfer process augmented by the cloning process. Rather than reproducing those steps in their entirety, the steps are presented here in a summary fashion with the difference between the steps highlighted.

Cloning cut-overs are preferably employed when transferring instances that require capturing and replicating the run state of the machine. Capturing the run state of the machine occurs while imaging the instance 1505 in addition to imaging the disk volumes and hardware set of the instance. The run state of a machine comprises the CPU, the in memory CPU instruction set, the memory state and register values, as well as run-time variables. When determining the best fit remote server in step 1521, these configurations are additionally taken into account.

Replicating the run-state starts when booting from the staging image in step 1527. The staging image must be reconfigurable to mirror the run state of the selected computing instance. In a preferred embodiment, the booting process still involves transferring the boot sequence to the storage target as seen in step 1529, but as an additional step in booting, the run state of the machine is replicated based on the image taken in step 1505.

Because additional processes occur while steps 1505-1527 are being performed, the run state of the machine must be mirrored in step 1531 before a cut-over can occur in step 1533. Mirroring the run state of the machine comprises capturing the run-state of the on-prem machine and replicating the run state to the cloud machine through a proxy system. The run state of a machine comprises the system states of the lower level virtual hardware components. Once the run state is captured, the run state is replicated and mirrored, which includes replicating the CPU, the in memory CPU instruction set, the memory state and register values, and mirroring these values to the clone of the machine on the cloud host. This step may recur multiple times in order to synchronize the run-states and/or state variables of the machines.

In a preferred embodiment, the last step 1533 in this process 1501 is cutting over from the on-prem instance to the mirrored cloud computing instance 1531. This step may not occur until the run state and state variables of the computing instance are adequately mirrored by the cloud computing machine. The adequacy of a mirror can be determined by successively measuring the change in states along with the change in time between capturing a mirror. Another embodiment includes providing the cut-over while both the clone and selected instance are in standby mode. In this embodiment, once the active mode instance is turned off, the standby mode instance is turned on. Thus, a user perceives a seamless transfer of a computing instance.

4.0 Hybridized Functionalities

Other attributes of embodiments may include reversing the instance transfer process, providing a migration strategy, and providing functionality to modify the edge proxies.

4.1 Reversing an Instance Transfer

Another attribute of an embodiment implements reversing the instance transfer process by leveraging data from the snapshot of an original instance, such that a minimum amount of data from the cloud needs to be reconfigured on-prem to reverse the instance transfer process.

Embodiments described herein refer to reversing the instance transfer process of an instance that was transferred from on-prem to on the cloud. However, the reversing instance transfer process can be implemented by any instance that was transferred to any host using the instance transfer process including, but not limited to, O2C, C2O, C2C, C2C (local), O2O, and the cloning processes previously described.

Reversing instance transfer refers to the process of re-coupling an instance with its local storage on-prem. The benefits of moving an instance back on-premises include, but are not limited to, optimizing performance of a data center after a peak load has completed, swapping instances between the cloud and on-premises, moving storage on-premises so the application can be re-deployed, and re-deploying a data center after on-premises infrastructure has been updated, improved, or debugged.

Using the management interface, the administrator selects the computing instance at step 1603 which was previously moved or cloned to the cloud and optionally identifies a local host as a target. The management system then triggers a flow of operations as follows:

(a) At decision point 1605, if the cloud instance is available, then the cloud instance is deactivated in step 1607. This can be shut down or simply suspended if possible. However this step 1607 is achieved, the instance is no longer running.

(b) In step 1609, all pending writes are flushed to on-prem. This step 1609 is particularly important if on-prem write persistence was selected for the computing instance. If cloud-only write persistence was selected the cloud storage for the instance may be optionally imaged and vacated.

(c) At decision point 1611, if on-prem write persistence was selected for the computing instance, then a snapshot of the on-prem virtual disks and dedicated network storage is taken at step 1613. This snapshot may be used for a quick roll back of changes.

(d) In steps 1615, 1619, and 1623 depending on the path taken, the original local instance configuration is restored. This not only includes reversing configuration changes, but also enabling devices that were disabled prior to the transfer. Specific configuration changes and device enablings can be determined using the snapshot of the instance previously taken in some embodiments of the instance transfer process.

(e) In steps 1615 and 1623, the storage is taken off the edge proxy and remounted on the restored local instance as needed. If cloud-only write persistence was selected for the computing instance, then the instance virtual disks likely need to be recreated from the pre-move snapshot in step 1619.

(f) In step 1621, the restored local instance is re-activated and unlocked for use by on-prem workloads.

4.3 Migration

Migration in this context focuses on the process of re-coupling a computing instance with at least some of its storage on the remote host. Embodiments described herein are directed to on-prem storage being transferred to a computing instance on a cloud host. Migration can happen to any storage that has been decoupled from its associated instance.

Additionally, even if an instance has not already been decoupled, migration may be employed by transferring or creating a computing instance using one of the heretofore described techniques.

Figure 17:
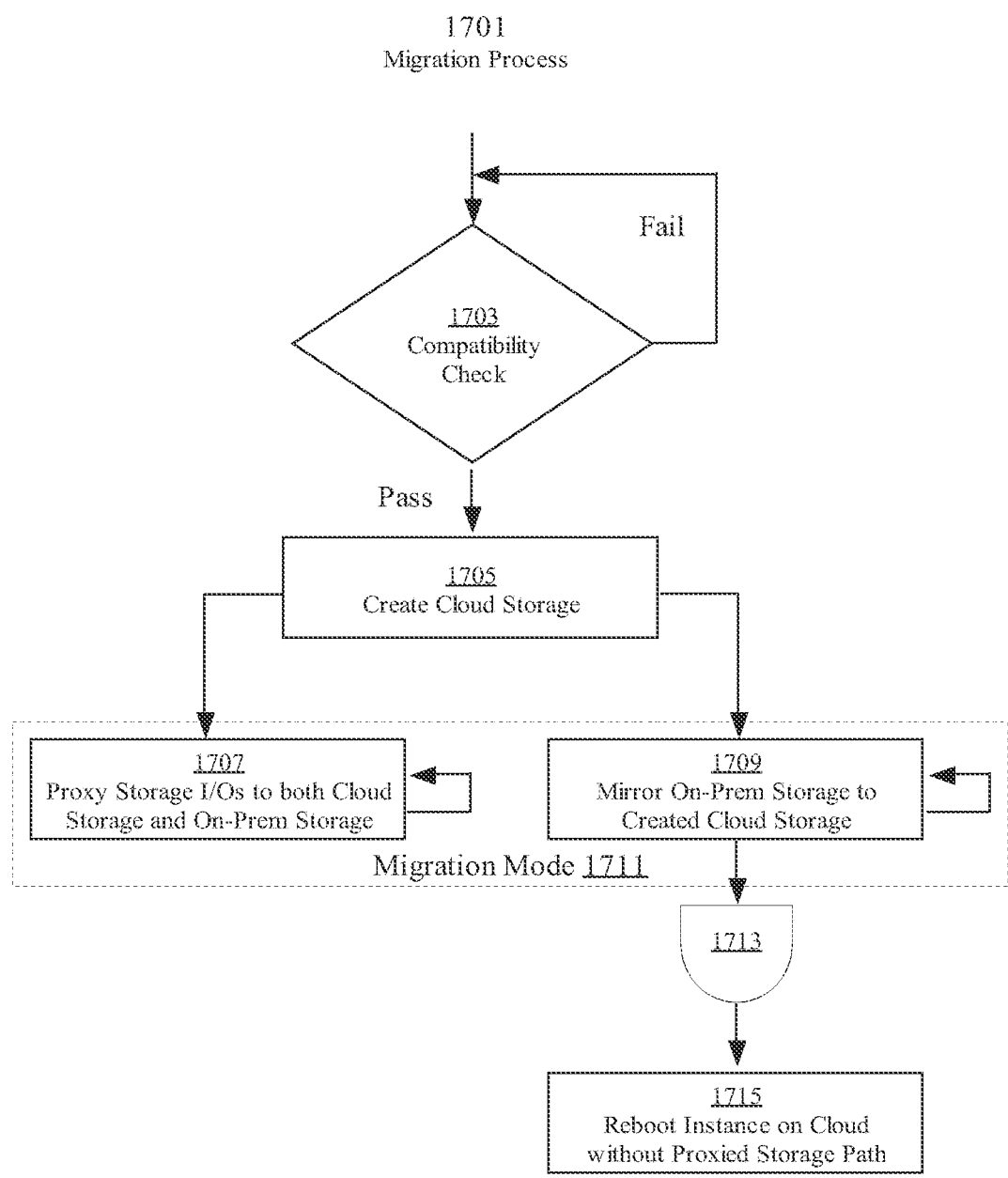
FIG. 17 is a flowchart illustrating steps of a migration process.

FIG. 17 is a flowchart illustrating steps of a migration process. The following steps preferably occur after an administrator indicates that a computing instance should permanently reside on a cloud host. However, the steps may be implemented to automatically, according workflows stored in a local edge proxy.

(a) At decision point 1703, in response to a user selecting an instance to permanently migrate, the edge proxy system performs a compatibility check as to ensure that the target cloud supports the storage device capacity and performance needs. If not compatible, another instance must be selected manually, automatically, or by suggestion. Once a compatible instance is determined, the following additional steps ensue:

(b) In step 1705, the cloud edge proxy sets up corresponding cloud storage as required by the instance. For example, referring to FIG. 18, if a computing instance 1807 has on-prem storage 131, then additional storage 653 is created on the cloud host 651.

(c) In step 1707, storage I/O requests are proxied to the cloud storage. Read requests are streamed and copied to the persistent cloud storage. For example, referring to FIG. 18, all read requests are streamed from 131 to both the computing instance 1807 and the cloud storage 653. Write requests are terminated locally on cloud storage alone. For example, referring to FIG. 18, all write requests are sent from cloud computing instance 1807 directly to the cloud storage 653.

In some embodiments, the write requests are also sent to the on-prem storage using a deferred write mode in case a user decides to reverse the migration process. For example, referring to FIG. 18, all I/O requests from computing instance 1807 would be sent to both cloud storage 653 and on-prem storage 131.

(d) In step 1709, a background process progressively synchronizes the content of the cloud storage with that of on-prem storage. The mirroring process may be performed repeatedly. If there is a delay, the mirroring process will only occur periodically until the delay is over. Once the delay is over, the mirroring process repeats at successively shorter intervals until the on-prem storage and the cloud storage are synced.

In some embodiments, steps 1707 and 1709 are part of a migration mode 1711. In the migration state, the system operates slightly differently from its normal read/write policies. In the normal read write policies, only specific requests are served to the system cache. In the migration state, all data and specific requests from the on-prem storage is streamed asynchronously to the cloud storage. Alternatively, a preference is granted to specifically requested data. In this manner, the cloud edge proxy can still serve workloads by acting as a cache while streaming on-prem storage through the cloud edge proxy to storage located on the cloud.

In the migration mode 1711, the cloud edge proxy keeps a log of what data has been transferred to the cloud and what data remains on prem. In this manner, the migration process can be delayed or stopped at any time without complete migration of all data. The cloud edge proxy will still be able to leverage benefits of the partial transfer by performing all reads and writes that it can on the cloud. The read process from FIG. 5 remains the same, but more data will be returned from step 515. The write process from FIG. 6 remains the same but with cloud only write persistence selected for the instance. This partial migration state can be leveraged in multiple stages to allow users to perform a scaled migration. A scaled migration may be desirable to systematically test costs, performance, capacity, and bandwidth of a cloud provider before completely committing to a permanent migration.

(e) In step 1713, when all storage is served from on-prem to the cloud storage, the admin is prompted to schedule a maintenance downtime to complete the transition and remove any edge proxies from the data path. After the downtime is granted, the instance is stopped and configurations are modified to mount the cloud storage volumes directly, including boot volumes.

(f) In step 1715, the instance is then rebooted, this time directly from the attached cloud storage volumes and migration is complete.

Figure 18:
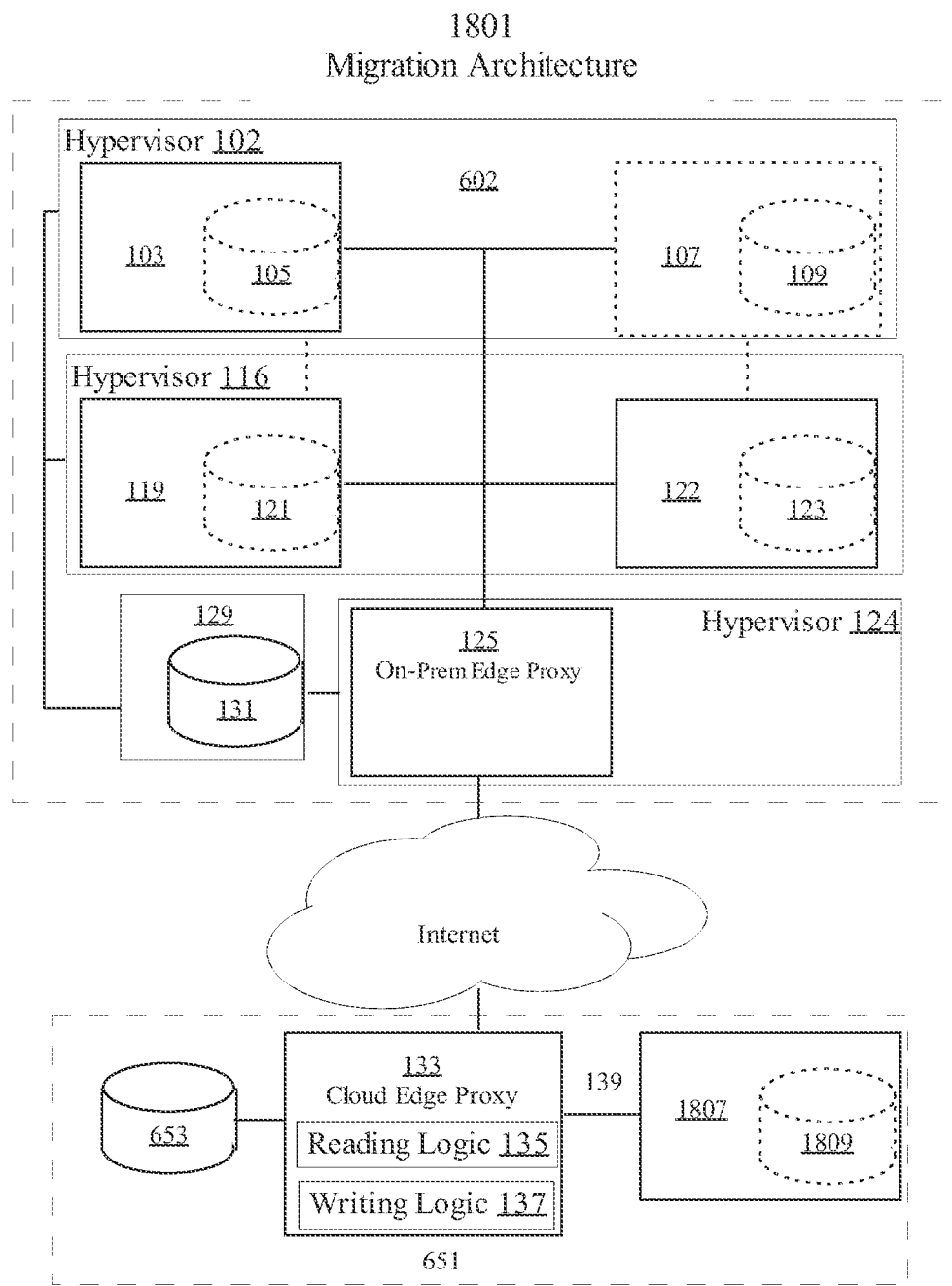
FIG. 18 is a block diagram illustrating a system architecture of a hybridized data center in a migration mode.

For example, referring to FIG. 18, once all data between 131 and 653 is mirrored, computing instance 1807 may be shut down so 653 can be mounted directly to the instance as 1809.

The use of the proxy system enables users to enjoy benefits of running instances in the cloud immediately without having to wait for the migration to complete while the bulk of the data is being transferred. The system also performs adequately even when an edge proxy is between the local storage and a computing instance. This means that switching the data path from migration mode to permanent cloud storage can occur during low workload periods.

In certain embodiments, the migration process has benefits of preventing downtime for a data center. Because the computing instance is already running, data fetching operations can be mirrored to storage on the cloud host as well as the normal operation of sending data on-prem. In a scaled manner, data calls are rerouted back to storage on the instance, which reduces reliance of an instance on the system cache and increases network latency. Once the storage of an instance is fully mirrored, storage from the on-prem cluster can be cutover to the cloud host storage. Essentially, there is no downtime in this process.

Additional benefits of moving an instance more permanently to a cloud host include, but are not limited to, optimizing performance of a data center after an initial increase in load forces a computing instance to transfer, quickly sending computing resources to the cloud host without having to migrate the storage first, backing up instances on the cloud host, and sending some storages off premises so an on-prem infrastructure can be updated, improved, or debugged.

4.4 Resizing Edge Proxies

Another hybridized functionality includes providing functionality to resize a system cache and modify the computing power or bandwidth of the edge proxies to elastically support needs of the network. This may support computing instances that require a higher load, more latency, or buffing a system for an initial boot sequence and then lessening the strain on the network as boot instructions are completed.

Resizing the system cache can be implemented by adding more elastic storage to the cloud edge proxy. This can be done automatically by leveraging a cloud host provider's API or this can be done manually by using the cloud host interface to create and mount a different amount of storage. The management service within the on-prem edge proxy then allots more storage to the system cache within the cloud edge proxy. If the Edge Proxy resize is required due to performance limitations of the Edge Proxy instance or its attached network then a resize may involve increasing the compute capacity (e.g. CPU, RAM, Network bandwidth) configured for that instance, i.e. the process of scaling-up the instance, or by adding additional instances in parallel, i.e. the process of scaling-out the proxy system.

5.0 Determining What Workloads to Cloud Burst

When extending a virtualized data center with cloud computing resources quickly and cost effectively without migrating a storage device, there are four systems to determining what workloads to move that can be used alone or in any combination.

The first system is to set up a structured system like first in first out (queue) or last in first out (stack). When a data center reaches a maximum capacity, the system does not evaluate actual computational needs of a workload to send one or more of the instances to a cloud resource.

In the second system, predictable workloads are cloud burst before experimental or volatile workloads that require variable computing resources, storage resources, networking capabilities on a project by project basis. When a customer comes to the administrator with a new project where the customer does not know the constraints of an individual workload, it may be desirable to keep the new project on-prem in a controlled environment to avoid external performance issues and service level agreements (SLAs). Thus, an on-prem workload with known constraints is moved to the cloud, in order to vacate space for the new experimental project.

The third system is to set up a policy based system such as DRS (a dynamic resource scheduler) or a load balancer. For example, if an instance under this system experiences a CPU usage higher than X, move the instance to a cloud host with available resources. An alternative example, if a computing instance's storage latency on a cloud host becomes higher than Y, move it back on-prem and move a different instance to the cloud. In certain embodiments, dynamic resource scheduler would move instances in real time based on needs of the data center, whereas the load balancer chooses high computing or low Input/Output unit (IOUs) workloads to send to the cloud.

The fourth system is to statically evaluate the data center on-prem, and based on this evaluation, to resize the proxies and move the necessary instances to leverage cloud resources. For example, a virtual appliance can take metrics of the average IOUs, peak loads, inter-instance communications, communications between instance and environment services and related metrics within each workload over the last week, month, or for a similar time period in the previous year. Based on this analysis, the management interface predicts which instances will have workloads consuming large amounts of computing resources, but small amounts of storage. Cloud bursting is preferably implemented on these instances first. For example, batch processing may require low IOUs, so instances executing these workloads are a strong candidate for cloud bursting.

Determining what workloads to cloud burst may include a combination, or weighted combination, of any or all of these systems, with or without additional systems, according to the needs of a particular data center.

Figure 19:
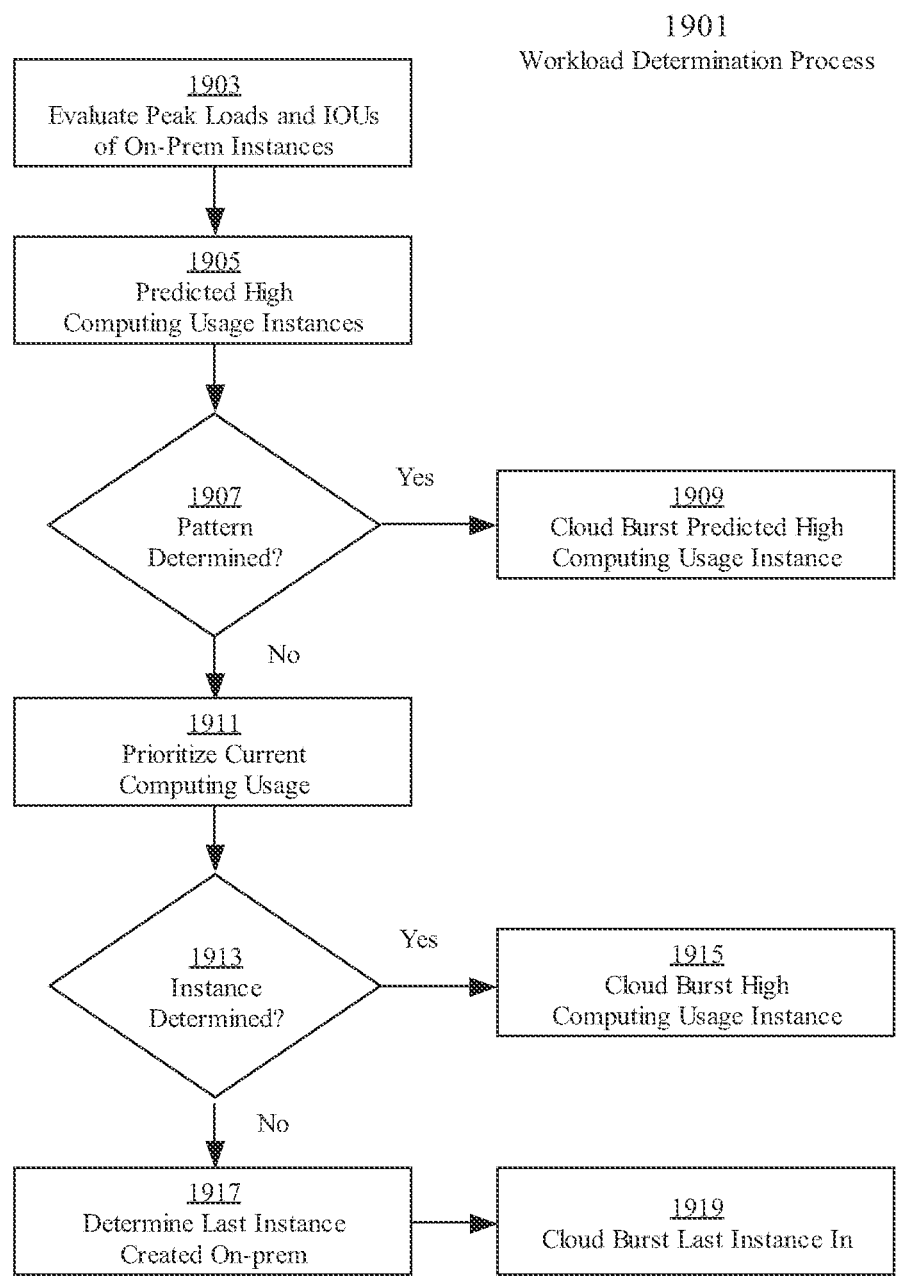
FIG. 19 is a flowchart illustrating a workload determination process.
Figure 20:
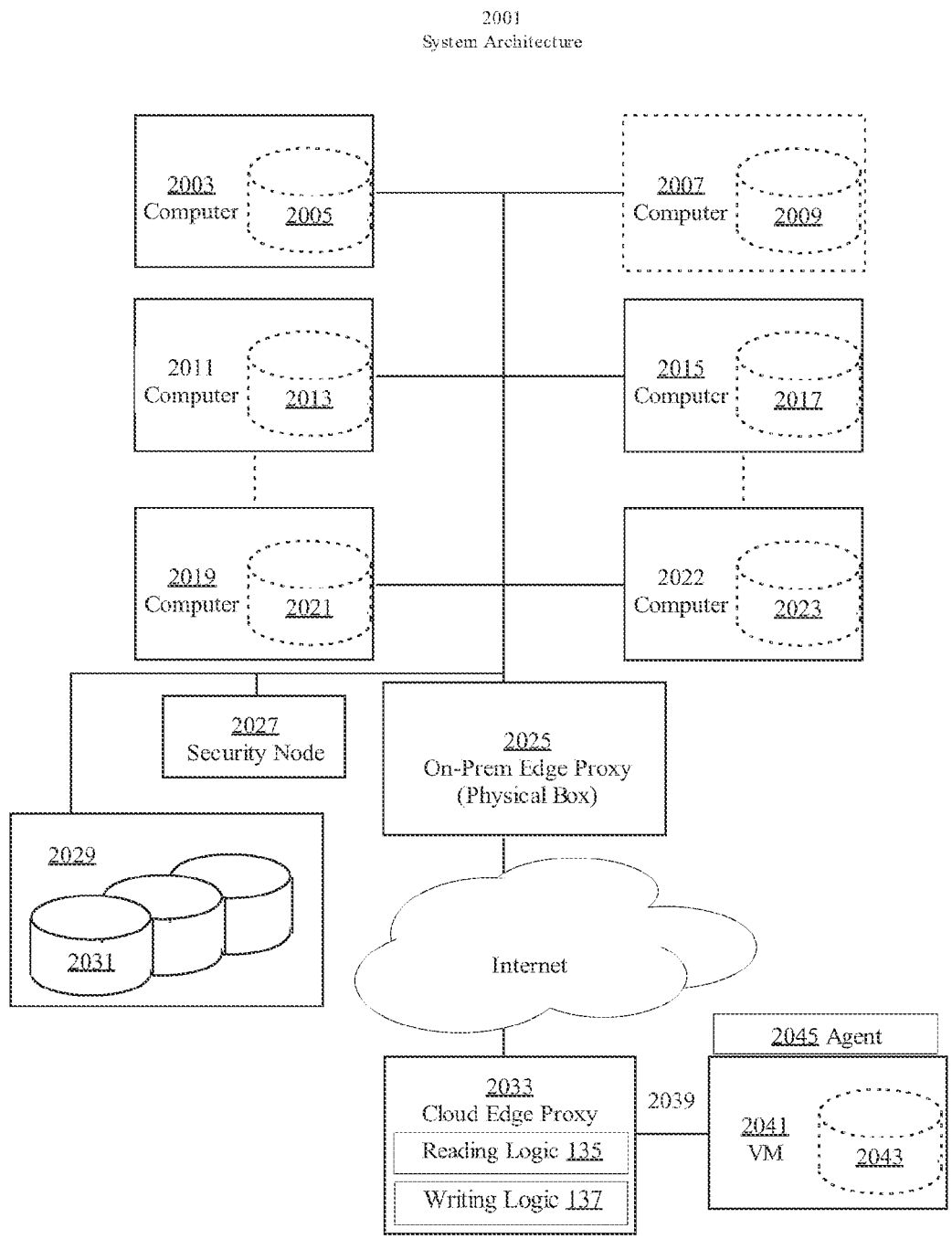
FIG. 20 is a block diagram illustrating a system architecture of an alternative hybridized data center.

An example embodiment of a determination system 1901 implemented by a management interface is shown in FIG. 19. To start, a management interface starts a static evaluation of the peak loads and IOUs incurred by the on-prem instances over the last week at block 1903. Using a statistical analysis technique, the high computing usage instances are predicted at block 1905. The statistical analysis technique is preferably performed on the on-prem edge proxy, but such a workload may be outsourced to another instance as needed. If pattern is determined where certain instances are likely to have higher usage of computing resources in the coming week at decision point 1907, then cloud bursting is implemented on those instances at block 1909.

If a pattern is not determined where certain instances are likely to have higher usage of computing resources in the coming week at decision point 1907, then the system prioritizes instances based on current computing usage at block 1911. At decision point 1913, determinations are made whether one instance has a clearly a higher computing usage than the others, and whether that instance can be transferred for other reasons such as connection to necessary hardware that does not exist in the cloud.

If an instance is determined to have a higher computing usage and it is transferrable, then a cloud bursting process is implanted for that instance at block 1915. If an instance is determined to not have a higher computing usage or it is not transferrable, then the system can simply determine what was the last instance added to the data center at block 1917. From this determination, the cloud bursting process is implemented as to that last instance created at block 1919.

6.0 Determining a Preferable Cloud Host for Cloud Bursting

Determining a cloud host can be based on one or more of the following factors: (A) storage performance, (B) number of workloads already on the host, (C) similar workloads already on the host, (D) likelihood of full migration, (E) cost structure of storage, (F) compliance regulations of data, (G) compatibility between source and target storage devices, (H) management complexity, and (I) high availability service level agreements (HA SLAs). In this section, cloud host is used broadly to refer to different servers or virtual servers within a cloud cluster and to refer to different cloud service providers.

(A) Storage performance—In most workloads, the workloads need access to storage. While embodiments are designed to maximize storage access latency, some cloud hosts will empirically maximize the benefits of these embodiments better than others. By monitoring latency metrics of the system associated with different cloud hosts, a system administrator can prioritize hosts that provide the best storage latency.

(B) Number of workloads already on the host—Much bigger workloads may be better suited for hosts that do not have any other workloads currently on them. Additionally, a workload with potential clones or potential for more workloads that share local storage may be better suited for an empty cloud host, so the operation can scale. Thus, empty cloud hosts may have a higher priority.

(C) Similar workloads already on the host, much bigger workloads may be better suited for hosts that have been thoroughly tested with smaller workloads. Additionally, a host that already has clones or other workloads that share local storage may be better suited as a target cloud host. As a result, cloud hosts that have already hosted similar workloads are a higher priority target cloud host.

(D) Likelihood of migration—If storage for a specific computational instance needs to migrate to satisfy performance requirements, then having a cloud host with the potential to expand to the necessary size is important. Thus, a system administrator may prioritize cloud hosts based their ability to handle a full migration project.

(E) Cost structure of storage—cost structures for cloud hosts can be fixed, tiered, or scalable. Administrators should consider cost in terms of ratio of local storage to on-prem storage of a particular workload before choosing a cloud host. Additionally, the cost structure can greatly affect scaled operations such as adding multiple similar workloads or performing a full migration. Thus, a system administrator may consider cost generally or the cost structure of storage when prioritizing target cloud hosts.

(F) Compliance, regulations of data—In many cases there are regulatory constraints on storing data permanently in the cloud. These regulations need to be considered on a case by case basis, but they can lead to different prioritization of workloads.

(G) Compatibility between source and target storage devices—different cloud hosts offer storage devices with features, capacity, count and performance capabilities which often differ from those of the source storage on premise—whether residing in virtual disks or in networked storage systems. Administrators should prioritize hosts that require the least number of transformations to the VM or application container.

(H) Management complexity and heterogeneous computing environments—Administrators familiar with their on-prem virtualization environment need to be trained and operate in a new computing environment. Hosts that provide similar experiences for the administrators should be given a higher priority.

(I) Maintaining performance and HA SLAs—cloud providers often limit maximum reserved storage IOPS and capacity per customer account, which require the administrator not only to consider cost premiums but also to prioritize use due to fixed allocations. Computing instance high availability (HA) is another challenge—cloud providers typically require a dual-instance setup to provide any SLA guarantee, given cloud backend maintenance windows are typically scheduled per availability zone. If a given cloud host does not support a dual-instance or active-standby operation, then workloads that require this functionality should be avoided.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 24:
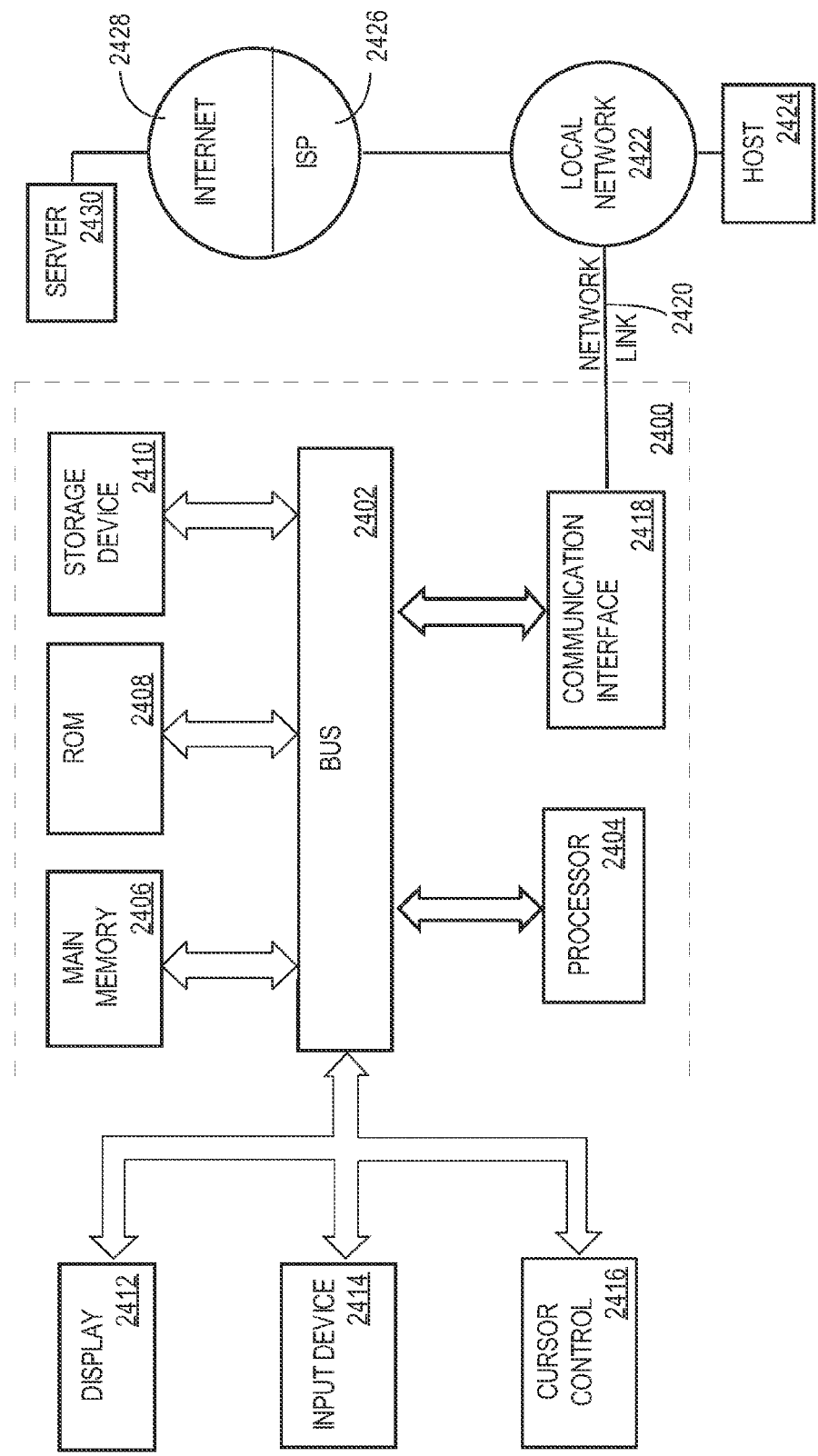
FIG. 24 is a block diagram illustrating a computer system that may be used to implement the techniques described herein.

For example, FIG. 24 is a block diagram that illustrates a computer system 2400 upon which an embodiment of the invention may be implemented. Computer system 2400 includes a bus 2402 or other communication mechanism for communicating information, and a hardware processor 2404 coupled with bus 2402 for processing information. Hardware processor 2404 may be, for example, a general purpose microprocessor.

Computer system 2400 also includes a main memory 2406, such as a random access memory (RAM) or other dynamic storage device, coupled to bus 2402 for storing information and instructions to be executed by processor 2404. Main memory 2406 also may be used for storing temporary variables or other intermediate information during execution of instructions to be executed by processor 2404. Such instructions, when stored in non-transitory storage media accessible to processor 2404, render computer system 2400 into a special-purpose machine that is customized to perform the operations specified in the instructions.

Computer system 2400 further includes a read only memory (ROM) 2408 or other static storage device coupled to bus 2402 for storing static information and instructions for processor 2404. A storage device 2410, such as a magnetic disk, optical disk, or solid-state drive is provided and coupled to bus 2402 for storing information and instructions.

Computer system 2400 may be coupled via bus 2402 to a display 2412, such as a cathode ray tube (CRT), for displaying information to a computer user. An input device 2414, including alphanumeric and other keys, is coupled to bus 2402 for communicating information and command selections to processor 2404. Another type of user input device is cursor control 2416, such as a mouse, a trackball, or cursor direction keys for communicating direction information and command selections to processor 2404 and for controlling cursor movement on display 2412. This input device typically has two degrees of freedom in two axes, a first axis (e.g., x) and a second axis (e.g., y), that allows the device to specify positions in a plane.

Computer system 2400 may implement the techniques described herein using customized hard-wired logic, one or more ASICs or FPGAs, firmware and/or program logic which in combination with the computer system causes or programs computer system 2400 to be a special-purpose machine. According to one embodiment, the techniques herein are performed by computer system 2400 in response to processor 2404 executing one or more sequences of one or more instructions contained in main memory 2406. Such instructions may be read into main memory 2406 from another storage medium, such as storage device 2410. Execution of the sequences of instructions contained in main memory 2406 causes processor 2404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 2410. Volatile media includes dynamic memory, such as main memory 2406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2402. Transmission media can also take the form of acoustic or light waves, such as those generated during radio-wave and infra-red data communications.

Various forms of media may be involved in carrying one or more sequences of one or more instructions to processor 2404 for execution. For example, the instructions may initially be carried on a magnetic disk or solid-state drive of a remote computer. The remote computer can load the instructions into its dynamic memory and send the instructions over a telephone line using a modem. A modem local to computer system 2400 can receive the data on the telephone line and use an infra-red transmitter to convert the data to an infra-red signal. An infra-red detector can receive the data carried in the infra-red signal and appropriate circuitry can place the data on bus 2402. Bus 2402 carries the data to main memory 2406, from which processor 2404 retrieves and executes the instructions. The instructions received by main memory 2406 may optionally be stored on storage device 2410 either before or after execution by processor 2404.

Computer system 2400 also includes a communication interface 2418 coupled to bus 2402. Communication interface 2418 provides a two-way data communication coupling to a network link 2420 that is connected to a local network 2422. For example, communication interface 2418 may be an integrated services digital network (ISDN) card, cable modem, satellite modem, or a modem to provide a data communication connection to a corresponding type of telephone line. As another example, communication interface 2418 may be a local area network (LAN) card to provide a data communication connection to a compatible LAN. Wireless links may also be implemented. In any such implementation, communication interface 2418 sends and receives electrical, electromagnetic or optical signals that carry digital data streams representing various types of information.

Network link 2420 typically provides data communication through one or more networks to other data devices. For example, network link 2420 may provide a connection through local network 2422 to a host computer 2424 or to data equipment operated by an Internet Service Provider (ISP) 2426. ISP 2426 in turn provides data communication services through the world wide packet data communication network now commonly referred to as the "Internet" 2428. Local network 2422 and Internet 2428 both use electrical, electromagnetic or optical signals that carry digital data streams. The signals through the various networks and the signals on network link 2420 and through communication interface 2418, which carry the digital data to and from computer system 2400, are example forms of transmission media.

Computer system 2400 can send messages and receive data, including program code, through the network(s), network link 2420 and communication interface 2418. In the Internet example, a server 2430 might transmit a requested code for an application program through Internet 2428, ISP 2426, local network 2422 and communication interface 2418.

The received code may be executed by processor 2404 as it is received, and/or stored in storage device 2410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   maintaining a local storage resource associated with a computing instance running remotely, wherein the instance couples to the local storage resource through a first edge appliance and a second edge appliance;
   streaming prioritized blocks from the local storage resource through the first edge appliance to a cache in the second edge appliance;

requesting, from the second edge appliance to the first edge appliance, blocks called by the instance, but not yet streamed to the second edge appliance from the first edge appliance;

wherein the second edge appliance serves as a block storage device for the instance;

wherein the method is performed by one or more computing devices.

2. The method of claim 1, further comprising determining a block priority by:

identifying a group of files accessed by a workload selected to run on the instance;

sorting the group of files;

for each file in the group of files, mapping a file to a set of corresponding blocks, setting a block priority of each block in the set based on the sorting the group of files.

3. The method of claim 1, further comprising determining a block priority by:

identifying a set of blocks accessed by a workload selected to run on the instance;

sorting the set of blocks in the local storage resource by most accessed to least accessed;

setting a block priority of each block in the set based on the sorting.

4. The method of claim 1, wherein the first edge appliance runs on a first set of hardware from a first computer through software selected from a group comprising:

a first operating system on a first virtual machine connected to the first set of hardware through a first type one hypervisor, the first operating system on the first virtual machine connected to the first set of hardware through a first type two hypervisor, and the first operating system connected directly to the first set of hardware;

wherein the second edge appliance runs on a second set of hardware from a second computer through software selected from a group comprising:

a second operating system on a second virtual machine connected to the second set of hardware through a second type one hypervisor, the second operating system on the second virtual machine connected to the second set of hardware through a second type two hypervisor, and the second operating system connected directly to the second set of hardware.

5. A system comprising:

a local storage resource;

a first edge appliance, coupled to the local storage resource;

a second edge appliance, remotely coupled to the first edge appliance;

a computing instance associated with an executing workload and associated with the local storage resource, coupled to the second edge appliance;

reading logic, in the second edge appliance, that is configured to maintain reads for the executing workload by, streaming prioritized blocks from the local storage resource through the first edge appliance to a secure cache in the second edge appliance;

wherein the reading logic is configured to maintain reads of the executing workload by requesting, from the second edge appliance to the first edge appliance, blocks called by the instance, and not yet streamed to the second edge appliance from the first edge appliance;

wherein the second edge appliance serves as a block storage device for the instance.

6. The system of claim 5, further comprising writing logic, in the second edge appliance, that is configured to maintain writes for the executing workload by aggregating written blocks in the second edge appliance to a threshold amount, and send the aggregated written blocks, from the second edge appliance through the first edge appliance, to the local storage resource.

7. The system of claim 6, wherein the writing logic, in the second edge appliance, that is configured to maintain writes for the executing workload, upon an instruction to send the instance running remotely back to a local computing device, immediately flushes any aggregated written blocks to the local storage resource.

8. The system of claim 5, further comprising writing logic, in the second edge appliance, that is configured to maintain writes for the executing workload by receiving a written block from the instance; storing the written block in a remote storage resource; and routing requests for data contained in the written block through the second edge appliance to the remote storage resource.

9. The system of claim 5, wherein the local storage resource comprises a virtual disk.

10. A method comprising:

executing a workload on a computer associated with a first operating system and a local storage resource;

coupling a first edge appliance to the computer;

remotely coupling a second edge appliance to the first edge appliance;

wherein the second edge appliance contains a diskless boot sequence and a cache that is empty;

wherein the cache is configured to store a partial image of the first operating system from the computer for future boot sequences;

wherein the first edge appliance is configured to stream blocks from the local storage resource to store in the cache of the second edge appliance.

11. The method of claim 10, wherein the executing workload is disassociated from the computer and is executed remotely by performing the further steps of:

using the first edge appliance, taking a snapshot of the computer;

using the first edge appliance, decoupling the local storage resource from the computer by routing traffic to and from the local storage resource through the first edge appliance;

using the first edge appliance, sending a message to provision a remote server coupled to the second edge appliance and configured with the diskless boot sequence;

using the remote server, performing a diskless boot of a computing instance by requesting a set of operating system blocks from the second edge appliance, which may be served using the partial image of the first operating system or further requested from the first edge appliance to be served from a portion of the snapshot;

using the remote server, mapping at least one mount point of the instance to the second edge appliance, wherein the second edge appliance serves as a block storage device for the instance;

using the first edge appliance, streaming, to the second edge appliance, a set of blocks contained in the portion of the snapshot, enabling the instance to finish booting and to run the executing workload.

12. The method of claim 11, wherein the message to provision the remote server includes a set of specifications; wherein the set of specifications are determined by performing the further steps of:

using the first edge appliance, scanning the snapshot;
wherein the scanning determines resources needed by the computer including number of CPUs, amount of RAM, and number of input/output operations per second;
wherein the set of specifications includes the resources needed to ensure the remote server comprises the resources necessary to run the instance.

13. The method of claim 11, wherein the executing workload is disassociated from the computer and is executed remotely by performing the further steps of:

using the second edge appliance, requesting, from the first edge appliance, blocks called by the instance, but not yet streamed to the second edge appliance from the first edge appliance.

14. The method of claim 11, wherein the second edge appliance contains a resizable system cache; wherein the resizable system cache in the second edge appliance serves as the block storage device for the instance; the resizable system cache comprising a first size cache accessed during booting and a second size cache accessed while running the executing workload.

15. The method of claim 11, wherein the first edge appliance runs on a first set of hardware from a first computer through software selected from a group comprising:

a second operating system on a first virtual machine connected to the first set of hardware through a type one hypervisor, the second operating system on the first virtual machine connected to the first set of hardware through a type two hypervisor, and the second operating system connected directly to the first set of hardware;

wherein the second edge appliance runs on a second set of hardware from a second computer through software selected from a group comprising:

a third operating system on a second virtual machine connected to the second set of hardware through the type one hypervisor, the third operating system on the second virtual machine connected to the second set of hardware through the type two hypervisor, and the third operating system connected directly to the second set of hardware.

16. The method of claim 11, wherein the executing workload is re-associated with the computer after disassociating from the computer by performing the steps of:

flushing any pending writes to the local storage resource;
booting the computer from the snapshot of the computer.

17. The method of claim 11, wherein the executing workload is disassociated from the computer and is executed remotely by performing the further steps of:

providing a migration command for mirroring the local storage resource to a remote storage resource after booting and running the first operating system for the executing workload on the remote server.

* * * * *